US011581572B2

(12) United States Patent
Mo et al.

(10) Patent No.: US 11,581,572 B2
(45) Date of Patent: Feb. 14, 2023

(54) LITHIUM METAL NITRIDES AS LITHIUM SUPER-IONIC CONDUCTORS

(71) Applicants: UNIVERSITY OF MARYLAND, COLLEGE PARK, College Park, MD (US); TOYOTA MOTOR ENGINEERING & MANUFACTURING NORTH AMERICA, INC., Plano, TX (US)

(72) Inventors: Yifei Mo, Fulton, MD (US); Qiang Bai, College Park, MD (US); Alexander Epstein, Berkeley, CA (US); Chen Ling, Ann Arbor, MI (US); Ying Zhang, Ann Arbor, MI (US)

(73) Assignees: UNIVERSITY OF MARYLAND, COLLEGE PARK, College Park, MD (US); TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 63 days.

(21) Appl. No.: 16/155,349

(22) Filed: Oct. 9, 2018

(65) Prior Publication Data

US 2020/0112053 A1   Apr. 9, 2020

(51) Int. Cl.
*H01M 10/0562*   (2010.01)
*H01M 10/0525*   (2010.01)
(Continued)

(52) U.S. Cl.
CPC ....... *H01M 10/0562* (2013.01); *H01M 4/366* (2013.01); *H01M 4/58* (2013.01);
(Continued)

(58) Field of Classification Search
CPC .... H01M 10/0562; H01M 4/366; H01M 4/58; H01M 4/62
See application file for complete search history.

(56) References Cited

U.S. PATENT DOCUMENTS

| 4,888,258 A | 12/1989 | Desjardins et al. |
| 5,702,843 A | 12/1997 | Mitate et al. |

(Continued)

FOREIGN PATENT DOCUMENTS

| JP | 9-330720 | | 12/1997 | |
| JP | 2004-079311 | * | 3/2004 | .............. H01M 4/58 |

(Continued)

OTHER PUBLICATIONS

Zhang et al., Experimental and Theoretical Investigation of Functionalized Boron Nitride as Electrode Materials for Li-ion Batteries, 2016, RSC adv., 27901.*

*Primary Examiner* — Helen Oi K Conley
(74) *Attorney, Agent, or Firm* — Oblon, McClelland, Maier & Neustadt, L.L.P.

(57) ABSTRACT

Solid-state lithium ion electrolytes of lithium metal nitride based compounds are provided which contain an anionic framework capable of conducting lithium ions. Materials of specific formulae are provided and methods to alter the materials with inclusion of aliovalent ions shown. Lithium batteries containing the composite lithium ion electrolytes are provided. Electrodes containing the lithium metal nitride based composites are also provided.

4 Claims, 29 Drawing Sheets

(51) Int. Cl.
H01M 4/36 (2006.01)
H01M 4/62 (2006.01)
H01M 4/58 (2010.01)

(52) U.S. Cl.
CPC ......... H01M 4/62 (2013.01); H01M 10/0525 (2013.01); *H01M 2300/0068* (2013.01)

(56) References Cited

U.S. PATENT DOCUMENTS

| | | |
|---|---|---|
| 6,017,654 A | 1/2000 | Kumta et al. |
| 6,410,188 B1 | 6/2002 | Shirane et al. |
| 6,537,702 B2 | 3/2003 | Nakura |
| 9,590,249 B2 | 3/2017 | Moriwaka et al. |
| 2003/0170161 A1* | 9/2003 | Iizuka .................. C09K 3/1409 423/290 |
| 2013/0052509 A1* | 2/2013 | Halalay ............. H01M 10/0567 429/129 |
| 2016/0133928 A1* | 5/2016 | Nemeth ................. H01M 4/60 429/213 |
| 2017/0194663 A1* | 7/2017 | Zhamu ................. H01M 4/134 |
| 2019/0348705 A1* | 11/2019 | Chen ................ H01M 10/0562 |

FOREIGN PATENT DOCUMENTS

| | | | | |
|---|---|---|---|---|
| WO | WO 2013/129376 A1 | 9/2013 | | |
| WO | WO 2016/141301 | * | 9/2016 | ............. C01B 35/14 |

* cited by examiner

| Peak Position | Relative Intensity |
|---|---|
| 22.56 | 18.15 |
| 27.37 | 41.97 |
| 28.55 | 47.80 |
| 28.98 | 13.63 |
| 30.19 | 58.12 |
| 30.48 | 26.65 |
| 31.27 | 65.80 |
| 31.44 | 50.79 |
| 31.53 | 100.00 |
| 37.75 | 13.53 |
| 39.79 | 13.26 |
| 45.36 | 19.94 |
| 45.79 | 22.19 |
| 47.24 | 21.71 |
| 47.76 | 15.88 |
| 48.07 | 22.56 |
| 53.81 | 10.89 |
| 54.14 | 23.92 |

Fig. 3

| Peak Position | Relative Intensity |
|---|---|
| 21.67 | 100.00 |
| 30.84 | 25.05 |
| 33.38 | 64.82 |
| 35.76 | 15.69 |
| 42.20 | 24.88 |
| 49.71 | 10.54 |
| 51.46 | 64.82 |
| 56.47 | 16.03 |
| 62.73 | 13.96 |
| 68.66 | 15.92 |
| 74.36 | 12.70 |

| Peak Position | Relative Intensity |
|---|---|
| 22.98 | 100.00 |
| 32.72 | 41.30 |
| 35.43 | 28.27 |
| 44.84 | 23.98 |
| 49.00 | 17.32 |
| 54.78 | 62.69 |
| 60.17 | 13.83 |
| 66.95 | 16.43 |
| 73.39 | 14.31 |

| Peak Position | Relative Intensity |
|---|---|
| 15.62 | 25.21 |
| 20.21 | 100.00 |
| 22.16 | 76.80 |
| 30.17 | 18.42 |
| 32.87 | 25.14 |
| 34.15 | 49.71 |
| 36.58 | 17.78 |
| 42.15 | 26.96 |
| 43.19 | 14.98 |
| 49.99 | 25.41 |
| 50.91 | 14.00 |
| 52.70 | 31.07 |
| 57.85 | 16.62 |
| 63.52 | 13.93 |
| 69.67 | 10.09 |
| 70.42 | 13.08 |
| 76.32 | 10.71 |

LITHIUM METAL NITRIDES AS LITHIUM SUPER-IONIC CONDUCTORS

THE NAMES OF THE PARTIES TO A JOINT RESEARCH AGREEMENT

The disclosure herein is a result of joint research effort conducted under a joint research agreement between TOYOTA MOTOR ENGINEERING & MANUFACTURING NORTH AMERICA, INC. having an address of 6565 Headquarters Drive W1-3C, Piano, Tex., 75024, and UNIVERSITY OF MARYLAND, COLLEGE PARK having an address of 2130 Mitchell Bldg. 7999 Regents Dr. College Park, Md., 20742.

FIELD OF THE DISCLOSURE

This disclosure is directed to novel lithium metal nitride compounds useful as a Li super-ionic conductor, solid electrolytes containing the novel lithium metal nitride compounds, and an electrode coating layer for a Li metal battery and a Li-ion battery containing the novel lithium metal nitride compounds.

BACKGROUND

Li-ion batteries have traditionally dominated the market of portable electronic devices. However, conventional Li-ion batteries contain flammable organic solvents as components of the electrolyte and this flammability is the basis of a safety risk which is of concern and could limit or prevent the use of Li-ion batteries for application in large scale energy storage.

Replacing the flammable organic liquid electrolyte with a solid Li-ion conductive phase would alleviate this safety issue, and may provide additional advantages such as improved mechanical and thermal stability. A primary function of the solid Li-ion conductive phase, usually called solid Li-ion conductor or solid state electrolyte, is to conduct Li$^+$ ions from the anode side to the cathode side during discharge and from the cathode side to the anode side during charge while blocking the direct transport of electrons between electrodes within the battery.

Moreover, lithium batteries constructed with nonaqueous electrolytes are known to form dendritic lithium metal structures projecting from the anode to the cathode over repeated discharge and charge cycles. If and when such a dendrite structure projects to the cathode and shorts the battery energy is rapidly released and may initiate ignition of the organic solvent of the nonaqueous electrolyte.

Therefore, there is much interest and effort focused on the discovery of new solid Li-ion conducting materials which would lead to an all solid state lithium battery. Studies in the past decades have focused mainly on ionically conducting oxides such as for example, LISICON ($Li_{14}ZnGe_4O_{16}$), NASICON($Li_{1.3}Al_{0.3}Ti_{1.7}(PO_4)_3$), perovskite (for example, $La_{0.5}Li_{0.5}TiO_3$), garnet ($Li_7La_3Zr_2O_{12}$), LiPON (for example, $Li_{2.88}PO_{3.73}N_{0.14}$) and sulfides, such as, for example, $Li_3PS_4$, $Li_7P_3S_{11}$ and LGPS ($Li_{10}GeP_2S_{12}$).

While recent developments have improved the conductivity of solid Li-ion conductor to the level of 1-10 mS/cm, which is comparable to that in liquid phase electrolyte, finding new Li-ion solid state conductors is of great interest to further improve battery performance and safety.

An effective lithium ion solid-state conductor will have a high Li$^+$ conductivity at room temperature. Generally, the Li$^+$ conductivity should be no less than $10^{-6}$ S/cm. Further, the activation energy of Li$^+$ migration in the conductor must be low for use over a range of operation temperatures that might be encountered in the environment. Additionally, the material should have good stability against chemical, electrochemical and thermal degradation. Unlike many conventionally employed non-aqueous solvents, the solid-state conductor material should be stable to electrochemical degradation reactivity with the anode and cathode chemical composition. The material should have low grain boundary resistance for usage in an all solid-state battery. Ideally, the synthesis of the material should be easy and the cost should not be high. Unfortunately, none of the currently known lithium ion solid electrolytes meet all these criteria. For example, $Li_{10}GeP_2S_{12}$ fails to meet the requirement of electrochemical stability and has a high cost due to the presence of Ge, despite its state-of-art Li conductivity. Environmentally stable composite materials having high Li$^+$ conductivity and low activation energy would be sought in order to facilitate manufacturing methods and structure of the battery.

The standard redox potential of Li/Li+ is −3.04 V, making lithium metal one of the strongest reducing agents available. Consequently, Li metal can reduce most known cationic species to a lower oxidation state. Because of this strong reducing capability when the lithium metal of an anode contacts a solid-state Li$^+$ conductor containing cation components different from lithium ion, the lithium reduces the cation specie to a lower oxidation state and deteriorates the solid-state conductor.

For example, the conductor of formula:

$Li_3PS_4$ contains P$^{5+}$ in the formula and is thus a secondary cation to the Li$^+$. When in contact with Li metal, reduction according to the following equation occurs (J. Mater. Chem. A, 2016, 4, 3253-3266).

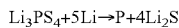
$Li_3PS_4 + 5Li \rightarrow P + 4Li_2S$

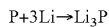
$P + 3Li \rightarrow Li_3P$

Similarly, $Li_{10}GeP_2S_{12}$ has also been reported to undergo degradation when in contact with lithium metal according to the following equations (J. Mater. Chem. A, 2016, 4, 3253-3266):

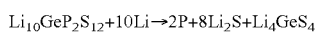
$Li_{10}GeP_2S_{12} + 10Li \rightarrow 2P + 8Li_2S + Li_4GeS_4$ $P + 3Li \rightarrow Li_3P$ $4Li_4GeS_4 + 31Li \rightarrow 16Li_2S + Li_{15}Ge_4$

$Li_{10}GeP_2S_{12}$ contains Ge$^{4+}$ and P$^{5+}$ and each is reduced as indicated.

In another example, $Li_7La_3Zr_2O_{12}$, which contains secondary cations La$^{3+}$ and Zr$^{4+}$ undergoes chemical degradation when in contact with lithium metal according to the following chemistry (J. Mater. Chem. A, 2016, 4, 3253-3266):

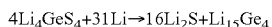
$6Li_7La_3Zr_2O_{12} + 40Li \rightarrow 4Zr_3O + 41Li_2O + 9La_2O_3$

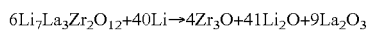
$Zr_3O + 2Li \rightarrow Li_2O + 3Zr$

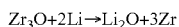
$La_2O_3 + 6Li \rightarrow 2La + 3Li_2O$

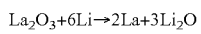
Thus, many current conventionally known solid Li-ion conductors suffer a stability issue when in contact with a Li metal anode.

The inventors of this application have been studying lithium compounds which may serve for future use of solid-state Li+ conductors and previous results of this study are disclosed in U.S. application Ser. No. 15/626,696, filed Jun. 19, 2017, U.S. Ser. No. 15/805,672, filed Nov. 7, 2017, 20 and U.S. application Ser. No. 16/013,495, filed Jun. 20, 2018. However, research effort continues to discover additional materials having maximum efficiency, high stability, low cost and ease of handling and manufacture.

Accordingly, an object of this application is to identify a range of further materials having high Li ion conductivity while being poor electron conductors which are suitable as a solid state electrolyte for a lithium ion battery and/or suitable as a protective coating layer for or a component of an electrode active material.

A further object of this application is to provide a solid state lithium ion battery and/or Lithium metal battery containing a solid state Li ion electrolyte membrane.

SUMMARY OF THE EMBODIMENTS

These and other objects are provided by the embodiments of the present application, the first embodiment of which includes a solid-state lithium ion electrolyte, comprising:

at least one material selected from the group of compounds of formulae (I), (II), (III) and (IV):

$$Li_y(M1)_{x1}BN_2 \quad (I)$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_y B_{1-x2}(M2)_{x2}N_2 \quad (II)$$

wherein x2 is a number from greater than 0 to less than 1, y is a value such that charge neutrality is obtained, and M2 is at least one element different from B selected from elements of groups 1, 2, 3, 4, 5, 6, 7, 8, 9, 10, 11, 12, 13, 14, 16 and 17;

$$Li_y BN_{2-x3}(X)_{x3} \quad (III)$$

wherein x3 is a number from greater than 0 to less than 2, y is a value such that charge neutrality is obtained, and X is at least one element different from N selected from elements of groups 15, 16 and 17; and $$Li_3BN_2 \quad (IV).$$

In an aspect of the first embodiment the solid state lithium ion electrolyte has a lithium ion (Li+) conductivity of from $10^{-6}$ to 10 mS/cm at 300K, an activation energy of 0.20 to 1.20 eV, and comprises a crystal lattice structure having an anti-fluorite type $A_2X$ unit cell.

In a second embodiment a solid-state lithium ion electrolyte, comprising:
at least one composite material selected from the group of compounds of formulae (V), (VI), (VII) and (VIII):

$$Li_y(M1)_{x1}ScN_2 \quad (V)$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_y Sc_{1-x2}(M2)_{x2}N_2 \quad (VI)$$

wherein x2 is a number from greater than 0 to less than 1, y is a value such that charge neutrality is obtained, and M2 is at least one element different from Sc selected from elements of groups 1, 2, 3, 4, 5, 6, 7, 8, 9, 10, 11, 12, 13, 14, 16 and 17; and $$Li_y ScN_{2-x3}(X)_{x3} \quad (VII)$$

wherein x3 is a number from greater than 0 to less than 2, y is a value such that charge neutrality is obtained, and X is at least one element different from N selected from elements of groups 15, 16 and 17; and $$Li_3ScN_2 \quad (VIII).$$

In an aspect of the second embodiment the solid state lithium ion electrolyte has a lithium ion (Li+) conductivity of from $10^{-1}$ to $10^2$ mS/cm at 300K, has an activation energy of from 0.10 to 0.25 eV, and comprises a crystal lattice structure having an anti-fluorite type $A_2X$ unit cell.

In a third embodiment a solid-state lithium ion electrolyte, comprising:
at least one material selected from the group of compounds of formulae (IX), (X), (XI) and (XII):

$$Li_y(M1)_{x1}AlN_2 \quad (IX)$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_y Al_{1-x2}(M2)_{x2}N_2 \quad (X)$$

wherein x2 is a number from greater than 0 to less than 1, y is a value such that charge neutrality is obtained, and M2 is at least one element different from Al selected from elements of groups 1, 2, 3, 4, 5, 6, 7, 8, 9, 10, 11, 12, 13, 14, 16 and 17;

$$Li_y AlN_{2-x3}(X)_{x3} \quad (XI)$$

wherein x3 is a number from greater than 0 to less than 2, y is a value such that charge neutrality is obtained, and X is at least one element different from N selected from elements of groups 15, 16 and 17; and $$Li_3AlN_2 \quad (XII).$$

In an aspect of the third embodiment the solid state lithium ion electrolyte has a lithium ion (Li+) conductivity of from $10^{-4}$ to $10^2$ mS/cm at 300K, has an activation energy of from 0.10 to 0.50 eV, and comprises a crystal lattice structure having an anti-fluorite type $A_2X$ unit cell.

In a fourth embodiment a solid-state lithium ion electrolyte, comprising:
at least one material selected from the group of compounds of formulae (XIII), (XIV), (XV) and (XVI):

$$Li_y(M1)_{x1}TaN_4 \quad (XIII)$$

wherein x1 is a number from greater than 0 to less than 7, y is a value such that charge neutrality is obtained, and M1 is at least one element different from Li selected from elements of groups 1, 2, 3, 4, 5, 6, 7, 8, 9, 10, 11, 12 and 13;

$$Li_y Ta_{1-x2}(M2)_{x2}N_4 \quad (XIV)$$

wherein x2 is a number from greater than 0 to less than 1, y is a value such that charge neutrality is obtained, and M2 is at least one element different from Ta selected from elements of groups 1, 2, 3, 4, 5, 6, 7, 8, 9, 10, 11, 12, 13, 14, 16 and 17;

$$Li_y TaN_{4-x3}(X)_{x3} \quad (XV)$$

wherein x3 is a number from greater than 0 to less than 4, y is a value such that charge neutrality is obtained, and X is at least one element different from N selected from elements of groups 15, 16 and 17; and $$Li_7TaN_4 \quad (XVI).$$

In an aspect of the fourth embodiment the solid state lithium ion electrolyte has a lithium ion (Li$^+$) conductivity of from $10^{-4}$ to 10 mS/cm at 300K, has an activation energy of from 0.25 to 0.45 eV and comprises a crystal lattice structure having an anti-fluorite type $A_2X$ unit cell.

In a fifth embodiment the present disclosure provides a solid state lithium battery, comprising: an anode; a cathode; and a solid state lithium ion electrolyte located between the anode and the cathode; wherein the solid state lithium ion electrolyte comprises at least one material selected from the group of compounds of formulae (I), (II), (III) and (IV):

$$Li_y(M1)_{x1}BN_2 \quad (I)$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_yB_{1-x2}(M2)_{x2}N_2 \quad (II)$$

wherein x2 is a number from greater than 0 to less than 1, y is a value such that charge neutrality is obtained, and M2 is at least one element different from B selected from elements of groups 1, 2, 3, 4, 5, 6, 7, 8, 9, 10, 11, 12, 13, 14, 16 and 17;

$$Li_yBN_{2-x3}(X)_{x3} \quad (III)$$

wherein x3 is a number from greater than 0 to less than 2, y is a value such that charge neutrality is obtained, and X is at least one element different from N selected from elements of groups 15, 16 and 17; and $$Li_3BN_2 \quad (IV)$$

In a sixth embodiment the present disclosure provides a solid state lithium battery, comprising: an anode; a cathode; and a solid state lithium ion electrolyte located between the anode and the cathode; wherein the solid state lithium ion electrolyte comprises at least one material selected from the group of compounds of formulae (V), (VI), (VII) and (VIII):

$$Li_y(M1)_{x1}ScN_2 \quad (V)$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_ySc_{1-x2}(M2)_{x2}N_2 \quad (VI)$$

wherein x2 is a number from greater than 0 to less than 1, y is a value such that charge neutrality is obtained, and M2 is at least one element different from Sc selected from elements of groups 1, 2, 3, 4, 5, 6, 7, 8, 9, 10, 11, 12, 13, 14, 16 and 17; and $$Li_yScN_{2-x3}(X)_{x3} \quad (VII)$$

wherein x3 is a number from greater than 0 to less than 2, y is a value such that charge neutrality is obtained, and X is at least one element different from N selected from elements of groups 15, 16 and 17; and $$Li_3ScN_2 \quad (VIII)$$

In a seventh embodiment the present disclosure provides a solid state lithium battery, comprising: an anode; a cathode; and a solid state lithium ion electrolyte located between the anode and the cathode; wherein the solid state lithium ion electrolyte comprises at least one composite material selected from the group of compounds of formulae (IX), (X), (XI) and (XII):

$$Li_y(M1)_{x1}AlN_2 \quad (IX)$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_yAl_{1-x2}(M2)_{x2}N_2 \quad (X)$$

wherein x2 is a number from greater than 0 to less than 1, y is a value such that charge neutrality is obtained, and M2 is at least one element different from Al selected from elements of groups 1, 2, 3, 4, 5, 6, 7, 8, 9, 10, 11, 12, 13, 14, 16 and 17;

$$Li_yAlN_{2-x3}(X)_{x3} \quad (XI)$$

wherein x3 is a number from greater than 0 to less than 2, y is a value such that charge neutrality is obtained, and X is at least one element different from N selected from elements of groups 15, 16 and 17; and $$Li_3AlN_2 \quad (XII).$$

In an eighth embodiment the present disclosure provides a solid state lithium battery, comprising: an anode; a cathode; and a solid state lithium ion electrolyte located between the anode and the cathode; wherein the solid state lithium ion electrolyte comprises at least one material selected from the group of compounds of formulae (XIII), (XIV), (XV) and (XVI):

$$Li_y(M1)_{x1}TaN_4 \quad (XIII)$$

wherein x1 is a number from greater than 0 to less than 7, y is a value such that charge neutrality is obtained, and M1 is at least one element different from Li selected from elements of groups 1, 2, 3, 4, 5, 6, 7, 8, 9, 10, 11, 12 and 13;

$$Li_yTa_{1-x2}(M2)_{x2}N_4 \quad (XIV)$$

wherein x2 is a number from greater than 0 to less than 1, y is a value such that charge neutrality is obtained, and M2 is at least one element different from Ta selected from elements of groups 1, 2, 3, 4, 5, 6, 7, 8, 9, 10, 11, 12, 13, 14, 16 and 17;

$$Li_yTaN_{4-x3}(X)_{x3} \quad (XV)$$

wherein x3 is a number from greater than 0 to less than 4, y is a value such that charge neutrality is obtained, and X is at least one element different from N selected from elements of groups 15, 16 and 17; and $$Li_7TaN_4 \quad (XVI).$$

In special aspects of the fifth through eighth embodiments, the solid state lithium battery may be a lithium metal battery or a lithium ion battery.

In a ninth embodiment, the present disclosure provides an electrode having a current collector, an electrode active material mixed with one or more of the composite materials of formulae (I) to (XVI) and/or a coating layer of a composite material according to any of formulae (I) to (XVI) as described in the previous embodiments and aspects thereof is provided. Further, solid state batteries containing any of the electrodes of the ninth embodiment are provided.

The foregoing description is intended to provide a general introduction and summary of the present disclosure and is not intended to be limiting in its disclosure unless otherwise explicitly stated. The presently preferred embodiments, together with further advantages, will be best understood by reference to the following detailed description taken in conjunction with the accompanying drawings.

BRIEF DESCRIPTION OF THE DRAWINGS

FIG. 3 provides a Table listing the positions and relative intensities of the XRD analysis for $Li_3BN_2$.

DESCRIPTION OF THE PREFERRED EMBODIMENTS

Figure 1:
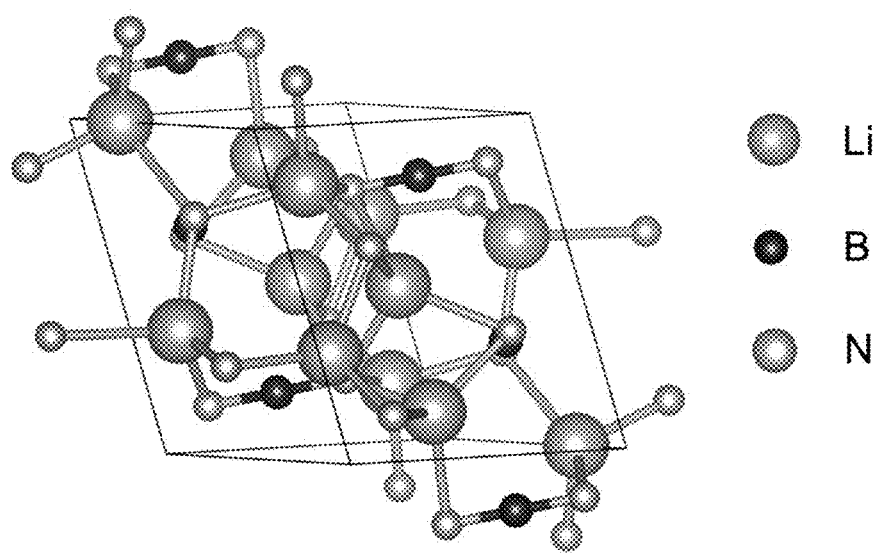
FIG. 1 shows the crystal structure of $Li_3BN_2$.

Throughout this description, the terms "electrochemical cell" and "battery" may be employed interchangeably unless the context of the description clearly distinguishes an electrochemical cell from a battery. Further the terms "solid-state electrolyte" and "solid-state ion conductor" may be employed interchangeably unless explicitly specified differently.

Structural characteristics of effective $Li^+$ conducting crystal lattices have been described by Ceder et al. (Nature Materials, 14, 2015, 1026-1031) in regard to known $Li^+$ ion conductors $Li_{10}GeP_2S_{12}$ and $Li_7P_3S_{11}$, where the sulfur sublattice of both materials was shown to very closely match a bcc lattice structure. Further, $Li^+$ ion hopping across adjacent tetrahedral coordinated $Li^+$ lattice sites was indicated to offer a path of lowest activation energy.

The inventors are conducting ongoing investigations of new lithium compounds in order to identify materials having the properties which may serve as solid-state electrolytes in solid state lithium batteries. Such materials may also have utility as components of an electrode active material to improve capacity and/or cycling performance. Additionally and/or alternatively, such materials may be employed as protecrice coatings on an electrode active layer. In the course of this ongoing study and effort the inventors have developed and implemented a methodology to identify materials which have chemical and structural properties which have been determined by the inventors as indicators of lithium ion conductance suitable to be a solid state electrolyte for a lithium-ion battery.

To qualify as solid state electrolyte in practical applications, the material must meet several certain criteria. First, it should exhibit desirable Li-ion conductivity, usually no less than $10^{-6}$ S/cm at room temperature. Second, the material should have good stability against chemical, electrochemical and thermal degradation. Third, the material should have low grain boundary resistance for usage in all solid-state battery. Fourth, the synthesis of the material should be easy and the cost should not be high.

A criterion of this methodology requires that to qualify as solid state electrolyte in practical application, the material must exhibit desirable Li-ion conductivity, usually no less than $10^{-6}$ S/cm at room temperature. Thus, ab initio molecular dynamics simulation studies were applied to calculate the diffusivity of Li ion in the lattice structures of selected lithium metal nitride materials. In order to accelerate the simulation, the calculation was performed at high temperatures and the effect of excess Li or Li vacancy was considered. In order to create excess Li or Li vacancy, aliovalent replacement of cation or anions may be evaluated. Thus, Li vacancy was created by, for example, partially substituting component ions with aliovalent cationic species while compensating the charge neutrality with Li vacancy or excess Li. For example, replacing 50% of Si in $Li_{10}Si_2PbO_{10}$ with P results in the formation of $Li_9PSiPbO_{10}$.

The diffusivity at 300 K was determined according to equation (I)

$$D=D_0 \exp(-E_a/k_bT) \qquad \text{equation (I)}$$

where $D_0$, $E_a$ and $k_b$ are the pre-exponential factor, activation energy and Boltzmann constant, respectively. The conductivity is related with the calculated diffusivity according to equation (II):

$$\sigma=D_{300}\rho e^2/k_bT \qquad \text{equation (II)}$$

where $\rho$ is the volumetric density of Li ion and e is the unit charge.

The anionic lattice of Li-ion conductors has been shown to match certain lattice types (see Nature Materials, 14, 2015, 2016). Therefore, in the anionic lattice of the potential $Li^+$ ion conductor is compared to the anionic lattice of $Li^+$ ion conductor known to have high conductivity.

Figure 20:
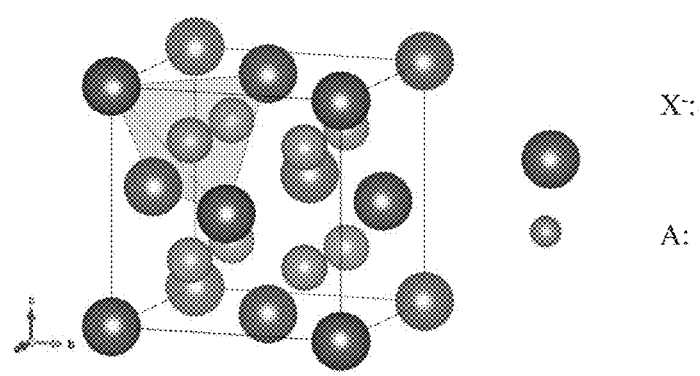
FIG. 20 shows a model crystal structure of the anti-fluorite type $A_2X$.

Ternary lithium nitrides crystallize in two broad classes: layered and anti-fluorite structures. Layered structures include $Li_3N$, a known two-dimensional (2D) superionic conductor. Anti-fluorite type structures include $Li_3BN_2$, $Li_3AlN_2$, $Li_3ScN_2$, and $Li_7TaN_4$. The anti-fluorite structure is a composed of a face centered cubic (FCC) anion framework with cations occupying tetrahedral positions. FIG. 20 shows a model crystal structure of the anti-fluorite type $A_2X$ wherein anions, X, form an FCC framework and cations, A, occupy the tetrahedral sites. In these structures, $Li^+$ ion diffusion consists of $Li^+$ ion hops between neighboring tetrahedral positions.

Thus, selected lithium metal nitride compounds were compared to Li-containing compounds reported in the inorganic crystal structure database (FIZ Karlsruhe ICSD—https://icsd.fiz-karlsruhe.de) and evaluated in comparison according to an anionic lattice matching method developed by the inventors for this purpose and described in copending U.S. application Ser. No. 15/597,651, filed May 17, 2017, to match the lattice of these compounds to known Li-ion conductors.

According to the anionic lattice matching method described in copending U.S. application Ser. No. 15/597,651, an atomic coordinate set for the compound lattice structure may be converted to a coordinate set for only the anion lattice. The anions of the lattice are substituted with the anion of the comparison material and the obtained unit cell rescaled. The x-ray diffraction data for modified anion-only lattice may be simulated and an n×2 matrix generated from the simulated diffraction data. Quantitative structural similarity values can be derived from the n×2 matrices.

The purpose of anionic lattice matching is to further identify compounds with greatest potential to exhibit high $Li^+$ conductivity. From this work, the compounds described in the embodiments which follow were determined to be potentially suitable as solid-state $Li^+$ conductors.

Elements suitable for aliovalent substitution may be selected by an ionic substitution probability determined by the method as described by Hautier et al. (Inorg. Chem. 2011, 50, 656-663) wherein candidate dopants may be selected by an ionic substitution probabilistic model, constructed upon data mining of all known inorganic crystal materials. Dopants which could potentially create vacancies or interstitials within the particular materials were included. The structures with dopants that were not energetically favorable would be screened and excluded during phase stability calculations. The configurations of the sublattices, dopants, and vacancies or interstitials were determined by the computation methods described herein. Such methods have been described for example, in the following reports:

Bai et al., ACS Appl. Energy Mater. 2018, 1, 1626-1634; and

He et al., Phys. Chem. Chem. Phys., 2015. 17, 18035.

Ab initio molecular dynamics (AIMD) simulation was then applied to predict the conductivity of the targeted lithium metal nitrides. The initial structures were statically relaxed and were set to an initial temperature of 100 K. The structures were then heated to targeted temperatures (600-1200 K) at a constant rate by velocity scaling over a time period of 2 ps. The total time of AIMD simulations were in the range of 200 to 400 ps. Typical examples of the calculated diffusivity as a function of temperature are shown in FIGS. 13-19 for samples of $Li_3BN_2$, $Li_3ScN_2$, $Li_3AlN_2$ and $Li_7 TaN_4$ doped with Be and Mg in place of Al. The $Li^+$ diffusivity at different temperatures from 600-1200 K follows an Arrhenius-type relationship.

Applying equation (I) above the diffusivity at 300 K was determined and then the conductivity may be determined using the link between conductivity and diffusivity of equation (II). Table 1 shows the activation energy and room temperature conductivity determined for each of the samples of FIGS. 13-19.

TABLE 1

Activation energy and room temperature conductivity of doped $Li_3BN_2$, $Li_3ScN_2$ and doped derivatives, $Li_3AlN_2$ and doped derivatives, and $Li_7TaN_4$ and doped derivative from AIMD simulations.

| composition | $E_a$ (eV) | σ (mS/cm) at 300 K |
|---|---|---|
| $Li_{2.875}Ge_{0.125}B_{0.875}N_2$ | 1.05 | $2.4 \times 10^{-10}$ |
| $Li_{2.75}C_{0.25}B_{0.75}N_2$ | 0.71 | $6.32 \times 10^{-6}$ |
| $Li_{2.625}C_{0.375}B_{0.625}N_2$ | 0.39 | 0.07 |
| $Li_{2.5}C_{0.5}B_{0.5}N_2$ | 0.36 | 0.30 |
| $Li_3AlN_2$ | 0.20 | 4.4 |
| $Li_{2.94}Zr_{0.06}Al_{0.94}N_2$ | 0.40 | $6 \times 10^{-3}$ |
| $Li_3ScN_2$ | 0.14 | 22.7 |
| $Li_{2.94}Zr_{0.06}Sc_{0.94}N_2$ | 0.16 | 12 |
| $Li_7TaN_4$ | 0.34 | 0.06 |
| $Li_{6.88}W_{0.13}Ta_{0.87}N_4$ | 0.3 | 0.2 |

As indicated, many of the compounds have conductivities above $10^{-6}$ S/cm, thus meeting one of the requirements to be suitable as a solid Li-ion conductor.

Accordingly, the first embodiment provides a solid-state lithium ion electrolyte, comprising: at least one material selected from the group of compounds of formulae (I), (II) and (III):

$$Li_y(M)_{x1}BN_2 \quad (I)$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_yB_{1-x2}(M2)_{x2}N_2 \quad (II)$$

wherein x2 is a number from greater than 0 to less than 1, y is a value such that charge neutrality is obtained, and M2 is at least one element different from B selected from elements of groups 1, 2, 3, 4, 5, 6, 7, 8, 9, 10, 11, 12, 13, 14, 16 and 17;

$$Li_yBN_{2-x3}(X)_{x3} \quad (III)$$

wherein x3 is a number from greater than 0 to less than 2, y is a value such that charge neutrality is obtained, and X is at least one element different from N selected from elements of groups 15, 16 and 17.

Figure 2:
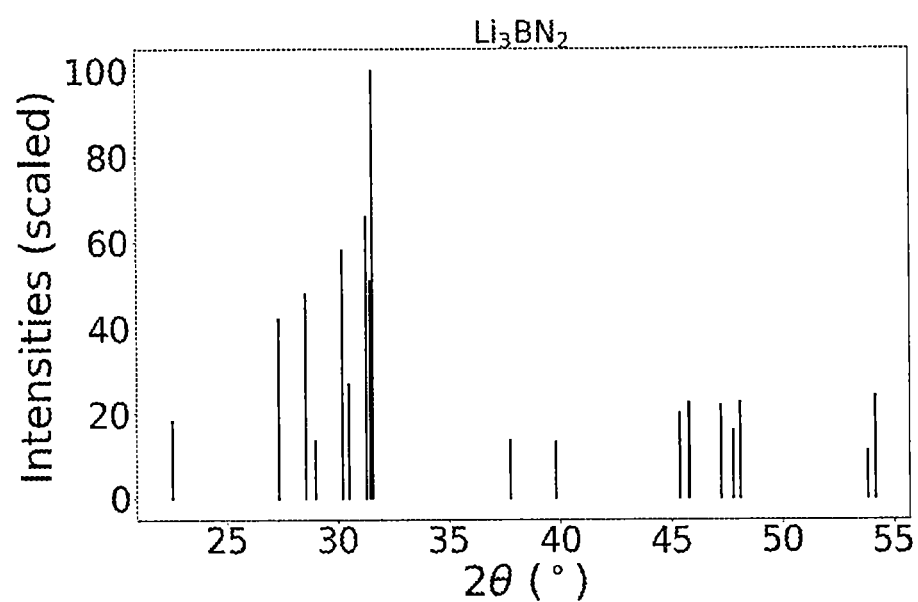
FIG. 2 shows a calculated XRD analysis for $Li_3BN_2$.
Figure 4:
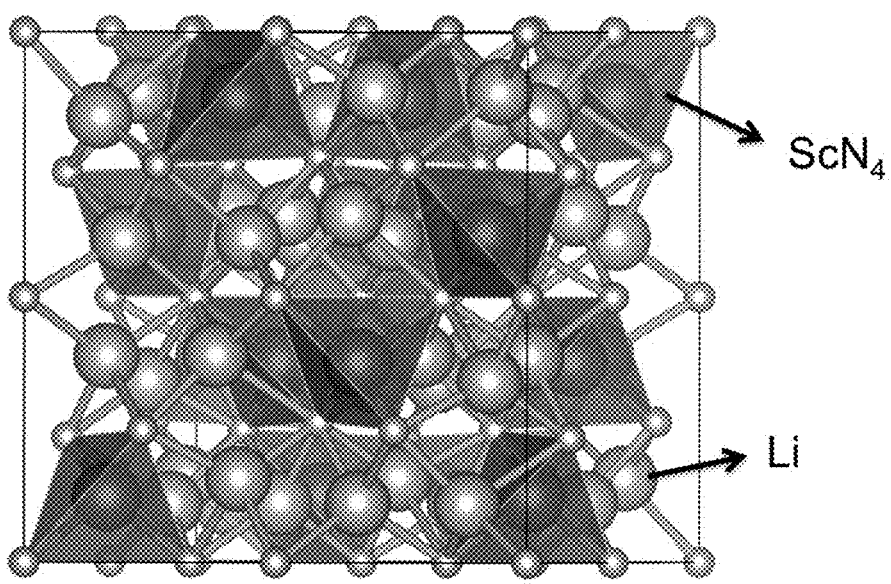
FIG. 4 shows the crystal structure of $Li_3ScN_2$.

The composites of formulae (I) to (Ill) are doped materials of the compound of formula (IV):

$$Li_3BN_2 \quad (IV)$$

wherein at least one of Li, B and N are aliovalently replaced as described above. The inventors have learned that the resulting doped materials retain the crystal structure of the base compound and have activation energies and conductivity related to the base compound of formula (IV). Based on the measurement methods described above the lithium ion ($Li^+$) conductivity of the solid state lithium ion electrolytes of the above formulae may be from $10^{-6}$ to 10 mS/cm at 300K, the activation energy may be from 0.20 to 1.20 eV, and the compounds of formulae (I) to (IV) comprise a crystal lattice structure having an anti-fluorite type $A_2X$ unit cell. A calculated X-ray Diffraction analysis of the compounds based on formula (IV) is shown in FIG. 2 and a Table listing the peak positions (2θ) and relative intensities is shown in FIG. 3.

In a second embodiment, the present disclosure provides a solid-state lithium ion electrolyte, comprising: at least one composite material selected from the group of compounds of formulae (V), (VI) and (VII):

$$Li_y(M1)_{x1}ScN_2 \quad (V)$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_y Sc_{1-x2}(M2)_{x2}N_2 \quad (VI)$$

wherein x2 is a number from greater than 0 to less than 1, y is a value such that charge neutrality is obtained, and M2 is at least one element different from Sc selected from elements of groups 1, 2, 3, 4, 5, 6, 7, 8, 9, 10, 11, 12, 13, 14, 16 and 17; and $$Li_y ScN_{2-x3}(X)_{x3} \quad (VII)$$

wherein x3 is a number from greater than 0 to less than 2, y is a value such that charge neutrality is obtained, and X is at least one element different from N selected from elements of groups 15, 16 and 17.

Figures 5, 6:
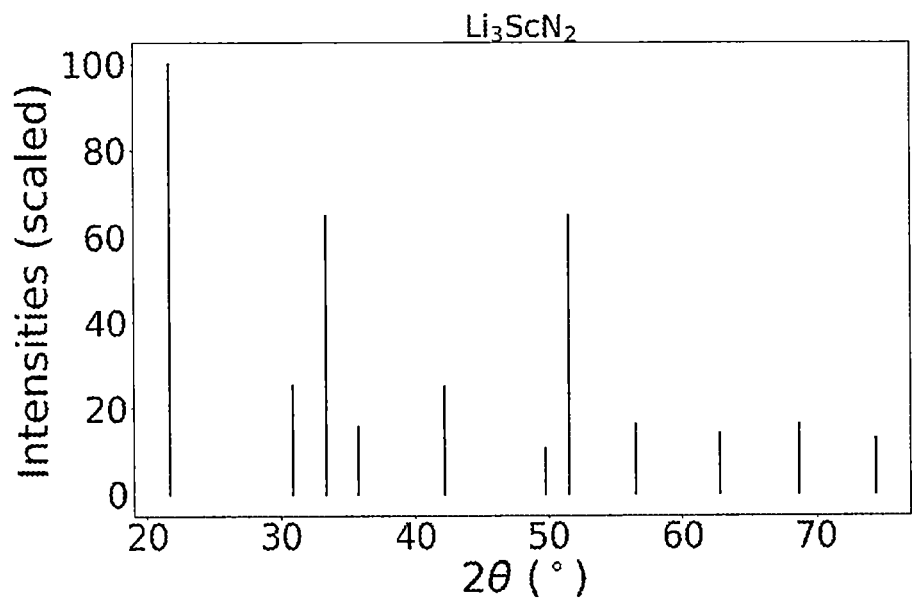
FIG. 5 shows a calculated XRD analysis for $Li_3ScN_2$.
FIG. 6 provides a Table listing the positions and relative intensities of the XRD analysis for $Li_3ScN_2$.
Figure 7:
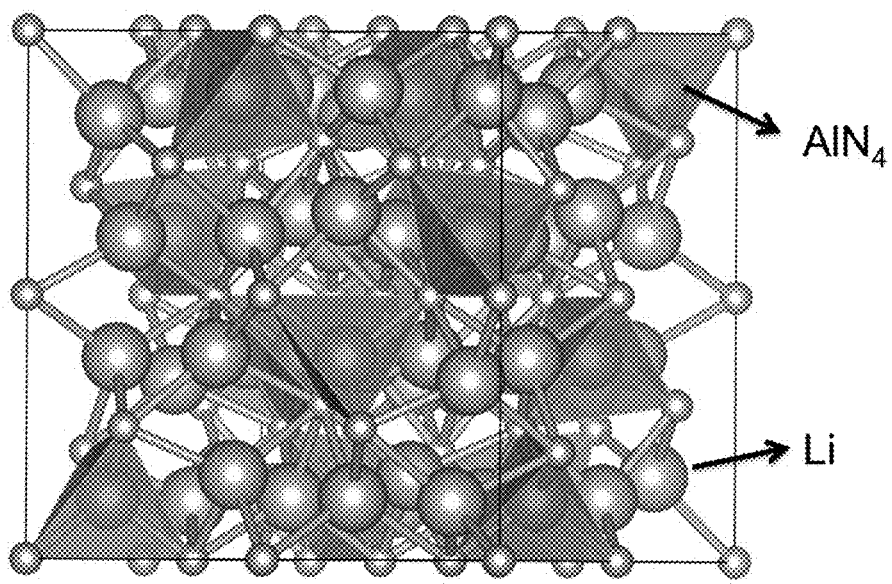
FIG. 7 shows the crystal structure of $Li_3AlN_2$.

The composites of formulae (V) to (VII) are doped materials of the compound of formula (VIII):

$$Li_3ScN_2 \quad (VIII)$$

wherein at least one of Li, Sc and N are aliovalently replaced as described above. The inventors have learned that the resulting doped materials retain the crystal structure of the base compound and have activation energies and conductivity related to the base compound of formula (VIII). Based on the measurement methods described above the lithium ion (Li) conductivity of the solid state lithium ion electrolytes of formulae (V) to (VIII) may be from $10^{-1}$ to $10^2$ mS/cm at 300K, the activation energies may be from 0.10 to 0.25 eV, and the compounds comprise a crystal lattice structure having an anti-fluorite type $A_2X$ unit cell. A calculated X-ray Diffraction analysis of the compounds based on formula (VIII) is shown in FIG. 5 and a Table listing the peak positions (2θ) and relative intensities is shown in FIG. 6.

In a third embodiment, the present disclosure provides a solid-state lithium ion electrolyte, comprising: at least one material selected from the group of compounds of formulae (IX), (X) and (XI):

$$Li_y(M1)_{x1}AlN_2 \quad (IX)$$

wherein x1 is a number from greater than 0 to less than 3, y is a value such that charge neutrality is obtained, and M1 is at least one element different from Li selected from elements of groups 1, 2, 3, 4, 5, 6, 7, 8, 9, 10, 11, 12 and 13;

$$Li_y Al_{1-x2}(M2)_{x2}N_2 \quad (X)$$

wherein x2 is a number from greater than 0 to less than 1, y is a value such that charge neutrality is obtained, and M2 is at least one element different from Al selected from elements of groups 1, 2, 3, 4, 5, 6, 7, 8, 9, 10, 11, 12, 13, 14, 16 and 17;

$$Li_y AlN_{2-x3}(X)_{x3} \quad (XI)$$

wherein x3 is a number from greater than 0 to less than 2, y is a value such that charge neutrality is obtained, and X is at least one element different from N selected from elements of groups 15, 16 and 17.

The composites of formulae (IX) to (XI) are doped materials of the compound of formula (XII):

$$Li_3AlN_2 \quad (XII)$$

wherein at least one of Li, Al and N are aliovalently replaced as described above. The inventors have learned that the resulting doped materials retain the crystal structure of the base compound and have activation energies and conductivity related to the base compound of formula (XII).

Figures 8, 9:
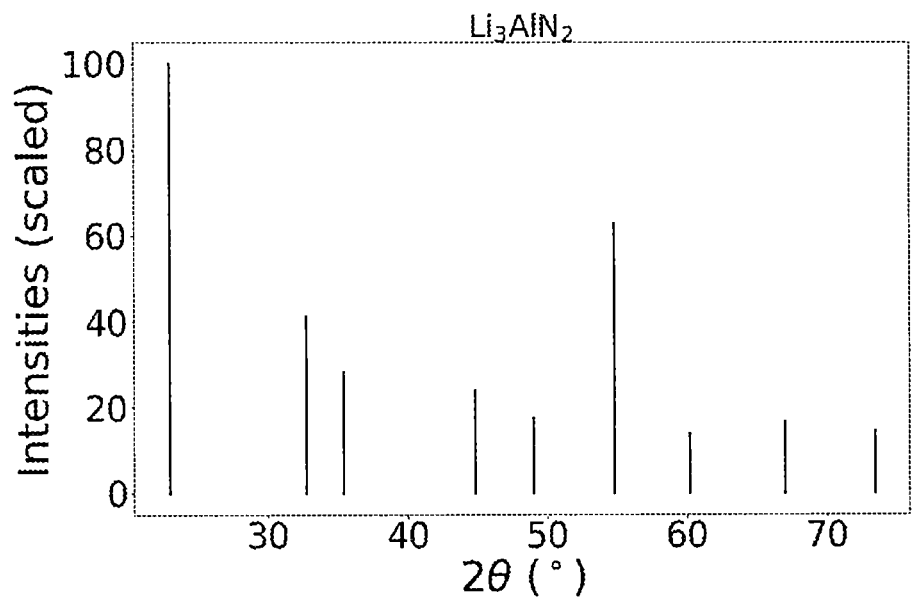
FIG. 8 shows a calculated XRD analysis for $Li_3AlN_2$.
FIG. 9 provides a Table listing the positions and relative intensities of the XRD analysis for $Li_3AlN_2$.
Figure 10:
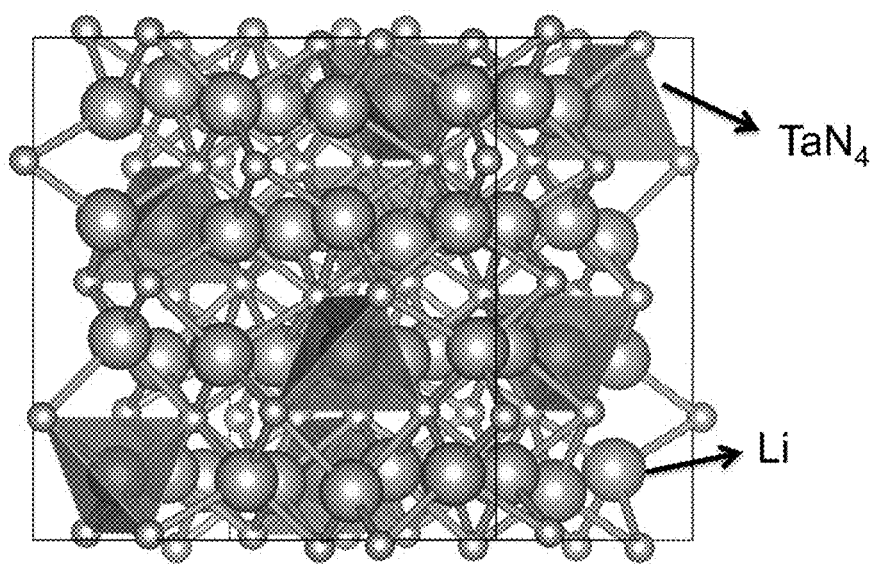
FIG. 10 shows the crystal structure of $Li_7 TaN_4$.

Based on the measurement methods described above the lithium ion (Li) conductivity of the solid state lithium ion electrolytes of formulae (IX) to (XII) may be from $10^{-4}$ to $10^2$ mS/cm at 300K, the activation energies may be from 0.10 to 0.50 eV, and the compounds comprise a crystal lattice structure having an anti-fluorite type $A_2X$ unit cell. A calculated X-ray Diffraction analysis of the compounds based on formula (XII) is shown in FIG. 8 and a Table listing the peak positions (2θ) and relative intensities is shown in FIG. 9.

In a fourth embodiment, the present disclosure provides a solid-state lithium ion electrolyte, comprising: at least one material selected from the group of compounds of formulae (XIII), (XIV) and (XV):

$$Li_y(M1)_{x1}TaN_4 \quad (XIII)$$

wherein x1 is a number from greater than 0 to less than 7, y is a value such that charge neutrality is obtained, and M1 is at least one element different from Li selected from elements of groups 1, 2, 3, 4, 5, 6, 7, 8, 9, 10, 11, 12 and 13;

$$Li_y Ta_{1-x2}(M2)_{x2}N_4 \quad (XIV)$$

wherein x2 is a number from greater than 0 to less than 1, y is a value such that charge neutrality is obtained, and M2 is at least one element different from Ta selected from elements of groups 1, 2, 3, 4, 5, 6, 7, 8, 9, 10, 11, 12, 13, 14, 16 and 17;

$$Li_y TaN_{4-x3}(X)_{x3} \quad (XV)$$

wherein x3 is a number from greater than 0 to less than 4, y is a value such that charge neutrality is obtained, and X is at least one element different from N selected from elements of groups 15, 16 and 17.

Figures 11, 12:
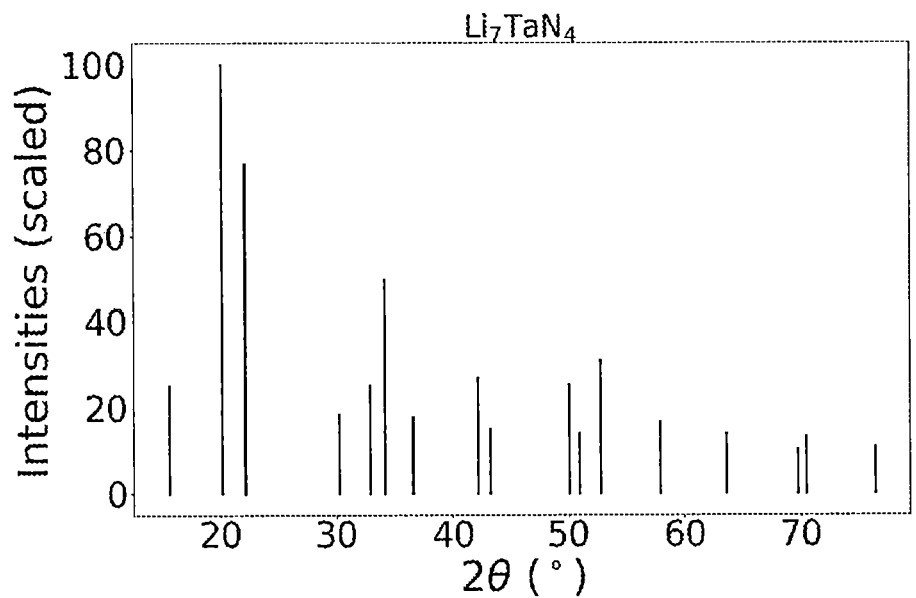
FIG. 11 shows a calculated XRD analysis for $Li_7 TaN_4$.
FIG. 12 provides a Table listing the positions and relative intensities of the XRD analysis for $Li_7 TaN_4$.
Figure 13:
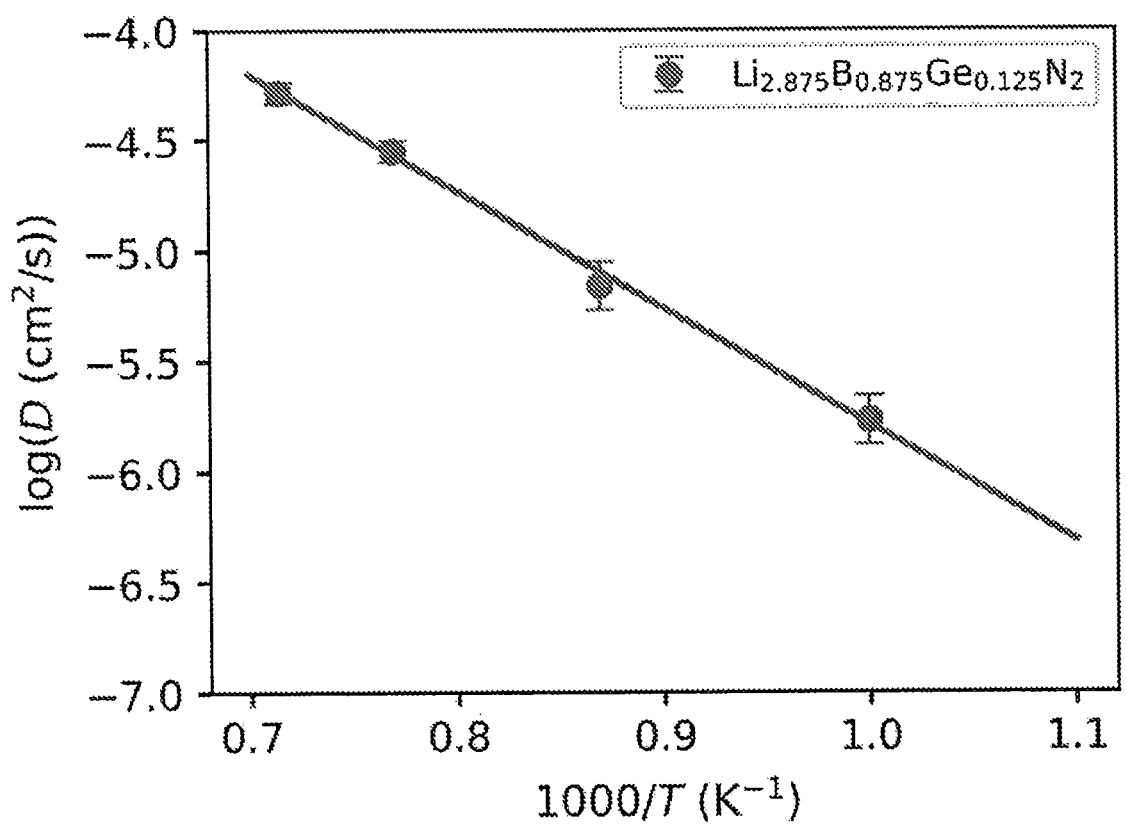
FIG. 13 shows an Arrhenius plot of $Li^+$ diffusivity D in $Li_3BN_2$ doped as $Li_{2.875}Ge_{0.125}B_{0.875}N_2$.
Figure 14:
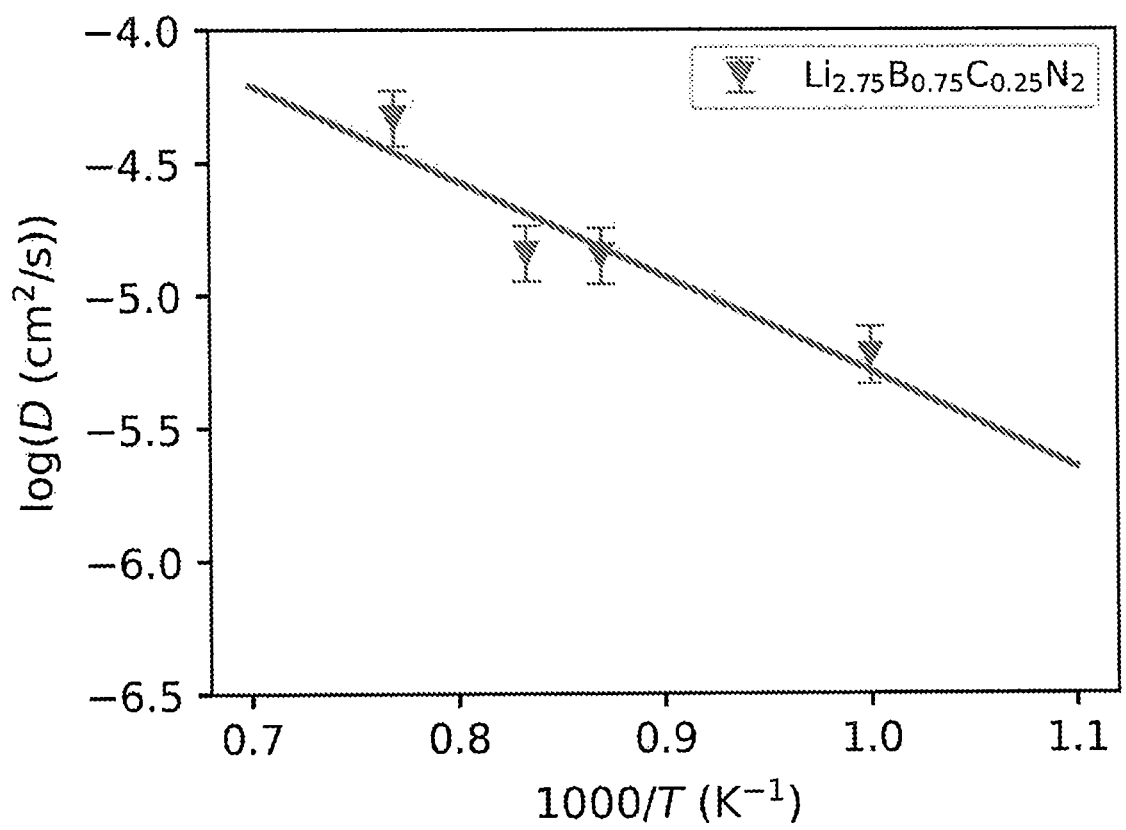
FIG. 14 shows an Arrhenius plot of $Li^+$ diffusivity D in $Li_3BN_2$, doped as $Li_{20.75}C_{0.25}B_{0.75}N_2$.
Figure 15:
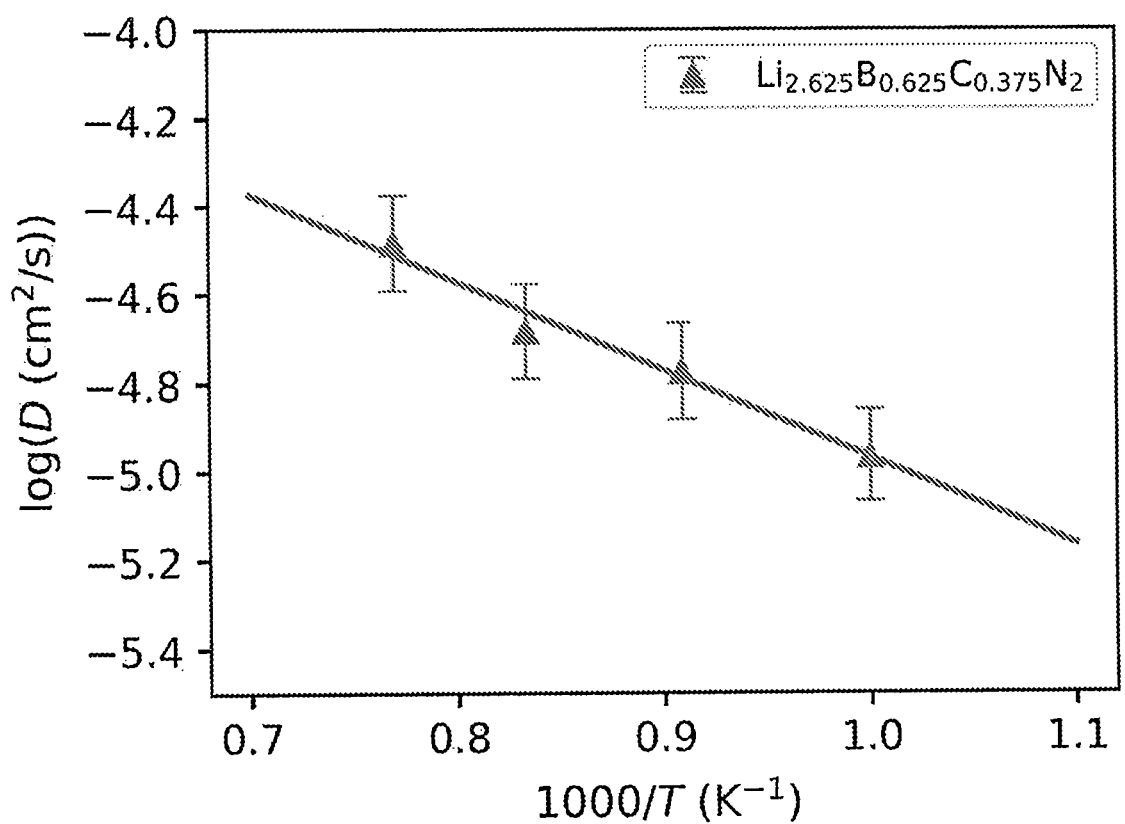
FIG. 15 shows an Arrhenius plot of $Li^+$ diffusivity D in $Li_3BN_2$, doped as $Li_{2.625}C_{0.375}B_{0.625}N_2$.
Figure 16:
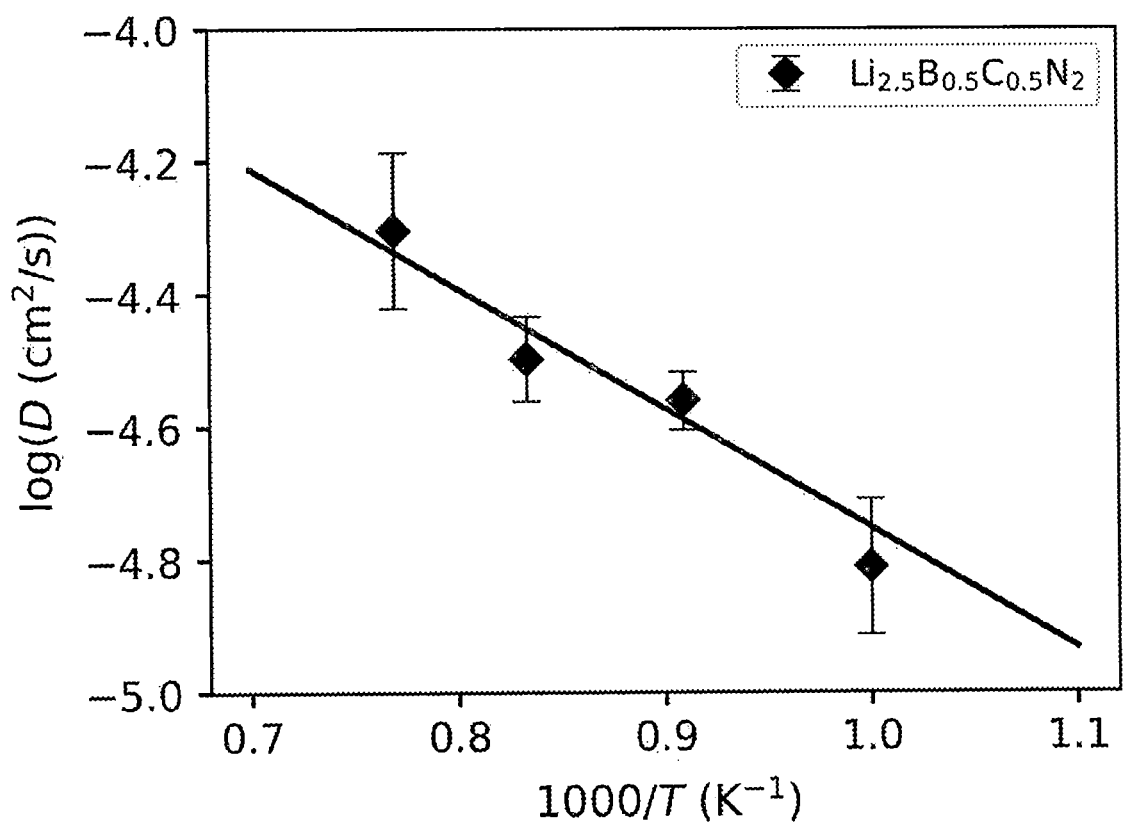
FIG. 16 shows an Arrhenius plot of $Li^+$ diffusivity D in $Li_3BN_2$, doped as $Li_{20.5}C_{0.5}B_{0.5}N_2$.
Figure 17:
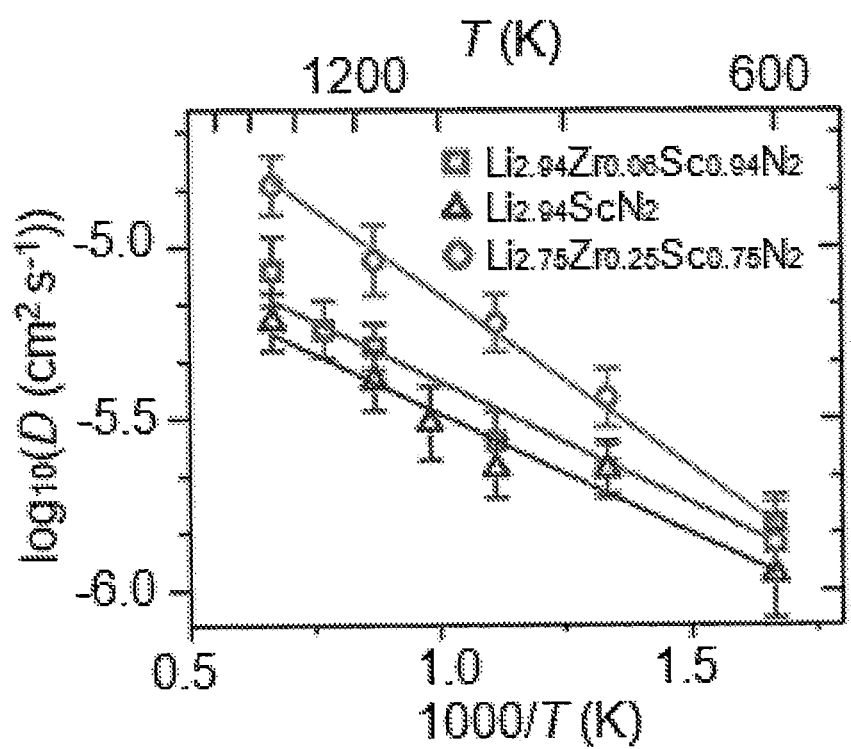
FIG. 17 shows an. Arrhenius plot of $Li^+$ diffusivity D for $Li_3ScN_2$ from AIMD simulations.
Figure 18:
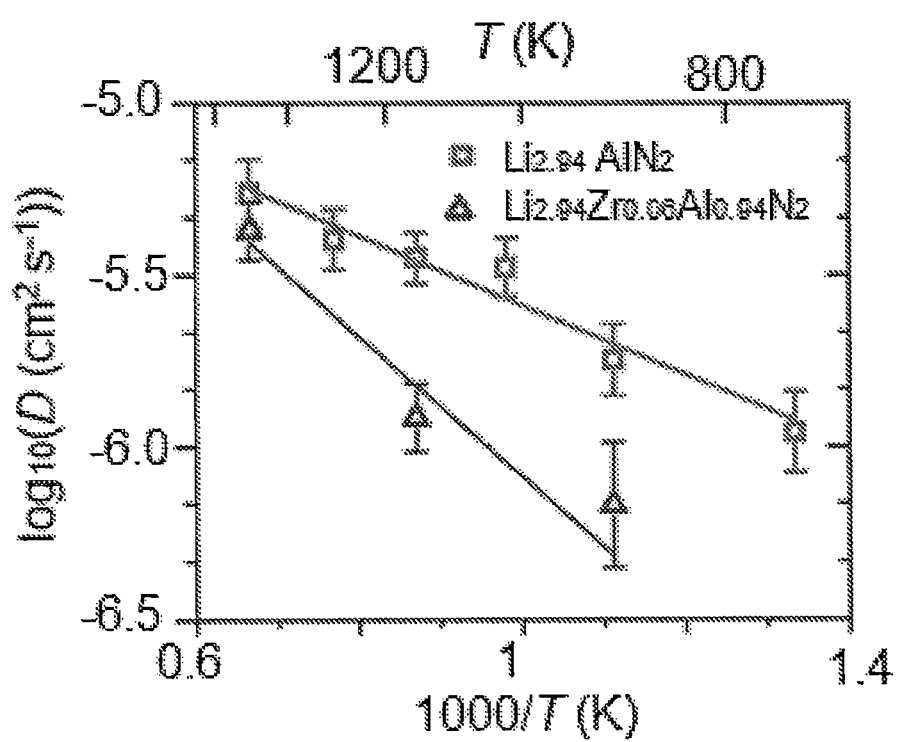
FIG. 18 shows an. Arrhenius plot of $Li^+$ diffusivity D for $Li_3AlN_2$ from AIMD simulations and NEB calculations.
Figure 19:
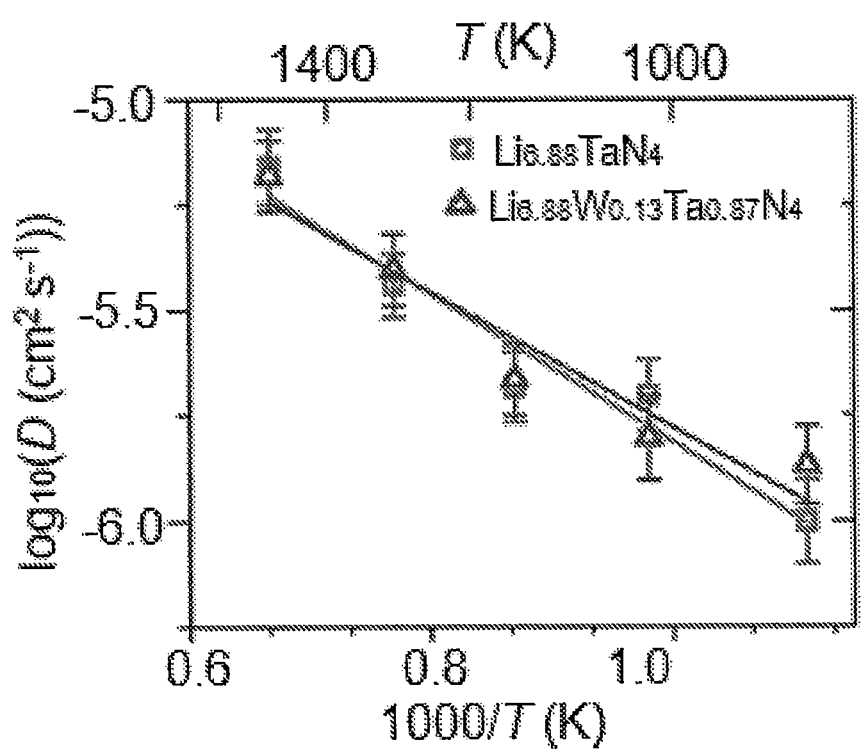
FIG. 19 shows an. Arrhenius plot of $Li^+$ diffusivity D for $Li_7 TaN_4$ from AIMD simulations and NEB calculations.

The composites of formulae (XIII) to (XV) are doped materials of the compound of formula (XVI):

$$Li_7 TaN_4 \quad (XVI)$$

wherein at least one of Li, Ta and N are aliovalently replaced as described above. The inventors have learned that the resulting doped materials retain the crystal structure of the base compound and have activation energies and conductivity related to the base compound of formula (XVI). Based on the measurement methods described above the lithium ion (Li$^+$) conductivity of the solid state lithium ion electrolytes of formulae (XIII) to (XVI) may be from $10^{-4}$ to 10 mS/cm at 300K, the activation energy may be from 0.25 to 0.45 eV, and the compounds comprise a crystal lattice structure having an anti-fluorite type $A_2X$ unit cell. A calculated X-ray Diffraction analysis of the compounds based on formula (IV) is shown in FIG. 11 and a Table listing the peak positions (2θ) and relative intensities is shown in FIG. 12.

Synthesis of the composite materials of the embodiments described above may be achieved by solid state reaction between stoichiometric amounts of selected precursor materials. Exemplary methods of solid state synthesis are described for example in each of the following papers: i) Monatshefte für Chemie, 100, 295-303, 1969; ii) Journal of Solid State Chemistry, 128, 1997, 241; iii) Zeitschrift für Naturforschung B, 50, 1995, 1061; iv) Journal of Solid State Chemistry 130, 1997, 90; v) Journal of Alloys and Compounds, 645, 2015, S174; and vi) Z. Naturforsch. 51b, 199652 5. Exemplary methods of synthesis of lithium nitride composites are provided in Nakura (U.S. Pat. No. 6,537,702) and Mitate et al. (U.S. Pat. No. 5,702,843). Adaptation of these methods to prepare the composite compounds according to the embodiments disclosed herein is well within the capability of one of ordinary skill in the art.

In further embodiments, the present application includes solid state lithium ion batteries containing the solid-state electrolytes described above. Solid-state batteries of these embodiments including metal-metal solid-state batteries may have higher charge/discharge rate capability and higher power density than classical batteries and may have the potential to provide high power and energy density.

Thus, in further embodiments, solid-state batteries comprising: an anode; a cathode; and a solid state lithium ion electrolyte according to the embodiments described above, located between the anode and the cathode are provided.

The anode may be any anode structure conventionally employed in a lithium ion battery or lithium metal battery. Generally such materials are capable of insertion and extraction of $Li^+$ ions. Example anode active materials may include graphite, hard carbon, lithium titanate (LTO), a tin/cobalt alloy and silicon/carbon composites. In one aspect the anode may comprise a current collector and a coating of a lithium ion active material on the current collector. Standard current collector materials include but are not limited to aluminum, copper, nickel, stainless steel, carbon, carbon paper and carbon cloth. In an aspect advantageously arranged with the solid-state lithium ion conductive materials described in the first and second embodiments, the anode may be lithium metal or a lithium metal alloy, optionally coated on a current collector. In one aspect, the anode may be a sheet of lithium metal serving both as active material and current collector.

The cathode structure may be any conventionally employed in lithium ion batteries, including but not limited to composite lithium metal oxides such as, for example, lithium cobalt oxide ($LiCoO_2$), lithium manganese oxide ($LiMn_2O_4$), lithium iron phosphate ($LiFePO_4$) and lithium nickel manganese cobalt oxide. Other active cathode materials may also include elemental sulfur and metal sulfide composites. The cathode may also include a current collector such as copper, aluminum and stainless steel.

In one aspect, the active cathode material may be a transition metal, preferably, silver or copper. A cathode based on such transition metal may not include a current collector.

In a further set of embodiments, electrodes containing the solid electrolyte materials of formulae (I) to (XVI) are also disclosed. Thus in the preparation of the electrode the active material as described above may be physically mixed with the solid electrolyte material before application to the current collector or the solid electrolyte material may be applied as a coating layer on the applied active material. In either embodiment the presence of the lithium ion super conductor on or within the electrode structure may enhance performance of the electrode, for example, by increase of capacity and/or charge/discharge cycling stability and especially when applied as a coating layer, may serve to protect a conventional solid state electrolyte. Further, such coating may serve to improve adhesion of the electrode surface with a solid state electrolyte.

Thus, an embodiment of the present disclosure includes a cathode comprising a current collector and a layer of cathode actiove material applied to the current collector wherein at least one of the following components is present: i) the cathode active material applied to the current collector is a physical mixture containing at least one of the solid electrolyte compounds of formulae (I) to (XVI) as described above; and ii) the layer of cathode active material applied to the current collector is coated with a layer comprising at least one of the solid electrolyte compounds of formulae (I) to (XVI).

In related embodiments the present disclosure includes an anode comprising a current collector and a layer of anode actioove material applied to the current collector wherein at least one of the following components is present: i) the anode active material applied to the current collector is a physical mixture containing at least one of the solid electrolyte compounds of formulae (I) to (XVI) as described above; and ii) the layer of anode active material applied to the current collector is coated with a layer comprising at least one of the solid electrolyte compounds of formulae (I) to (XVI).

Batteries containing a cathode as described in the above embodiment, an anode described in the above embodiment or containing both an anode and cathode according to the above embodiments are also embodiments of the present disclosure.

The above description is presented to enable a person skilled in the art to make and use the invention, and is provided in the context of a particular application and its requirements. Various modifications to the preferred embodiments will be readily apparent to those skilled in the art, and the generic principles defined herein may be applied to other embodiments and applications without departing from the spirit and scope of the invention. Thus, this invention is not intended to be limited to the embodiments shown, but is to be accorded the widest scope consistent with the principles and features disclosed herein. In this regard, certain embodiments within the invention may not show every benefit of the invention, considered broadly.

EXAMPLES

1. Method
All calculations were performed using DFT as implemented in the Vienna ab initio Simulation Package (VASP).
All calculations used a PBE pseudopotential within the PAW approach.
A. Materials
  The materials were selected from the ternary Li nitrides found to be stable against Li metal in previous work. Three structures, $Li_3AlN_2$, $Li_3ScN_2$, and $Li_7TaN_4$ were chosen as representative anti-fluorite structures.
A. NEB calculations
  The migration energy and pathway of a $Li^+$ ion was calculated using nudged elastic band (NEB) methods with a 2×2×2 gamma-centered k-point grid.
  The migration pathway corresponds to $Li^+$ vacancy-mediated migration between tetrahedral sites after removal of one $Li^+$ ion.
B. Diffusion
  Diffusivity was calculated from the mean squared displacement of the mobile ion, $Li^+$, during AIMD simulations over a range of temperatures.
  AIMD simulations were performed using a 1×1×1 supercell with a 1×1×1 gamma-centered k-point grid.
  The initial structures were heated from a temperature of 100 K to the target temperature over 2 ps.
C. Substitution Prediction
  To investigate the creation of a vacancy defect in the materials, a $Li^+$ vacancy was created through aliovalent substitution of the non-Li cation. For example, one $Al^{3+}$ ion was replaced by an $A^{4+}$ cation to form the composition $Li_{2.94}A_{0.06}Al_{0.94}N_2$ The candidates for cation dopant were obtained by the ionic substitution probabilistic model. Only dopants that could create one $Li^+$ vacancy were considered.

The configuration of the dopant and $Li^+$ vacancy was determined using the following method. The crystal structure was constructed such that the dopant and non-Li cation had disordered co-occupancy of the A-site and the $Li^+$ ion had disordered co-occupancy with the $Li^+$ vacancy on the $Li^+$-site. The pymatgen package was then used to randomly generate symmetrically distinctive structures using the disordered occupancies. All generated structures were statically relaxed in DFT calculations, and the structure with the lowest DFT energy was used for subsequent AIMD simulations.

A. Lithium ion diffusion in $Li_3AlN_2$ $Li_3AlN_2$ crystallizes in the anti-fluorite structure (Ia$\bar{3}$), in which all 48 $Li^+$ sites in the unit cell $Li_{48}Al_{16}N_{32}$ are symmetric (Wyckoff number 48e).

Fast lithium ion diffusion was observed in AIMD simulations of $Li_3AlN_2$ with one $Li^+$ vacancy inserted, $Li_{2.94}AlN_2$.

Figure 21A:
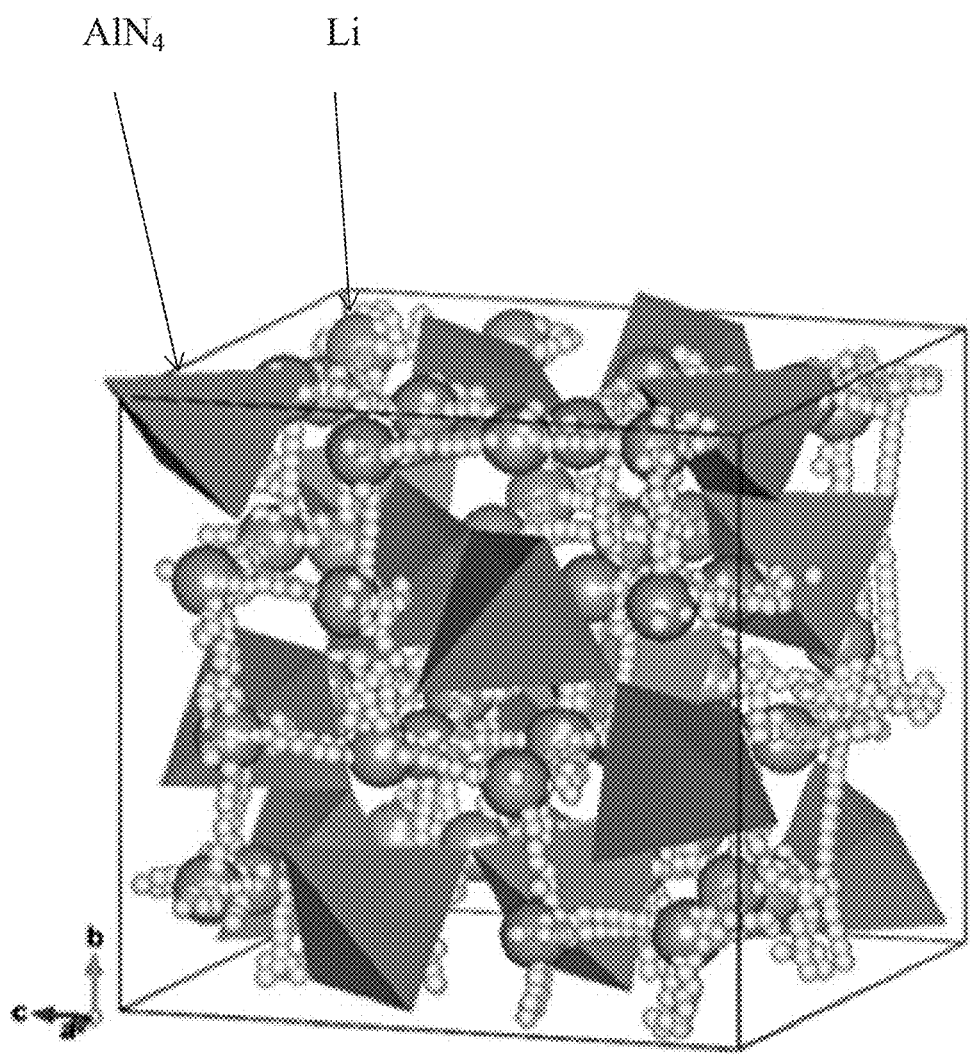
FIG. 21A shows time-averaged trajectories of $Li^+$ in $Li_{2.94}AlN_2$ from AIMD at 900K.

In both cases, there is 3D diffusion that percolates through the entire unit cell (FIG. 21A).

The positions of mobile $Li^+$ are averaged over a period of 0.8 ps and the initial positions of non-diffusing atoms are shown as polyhedra.

Figure 21B:
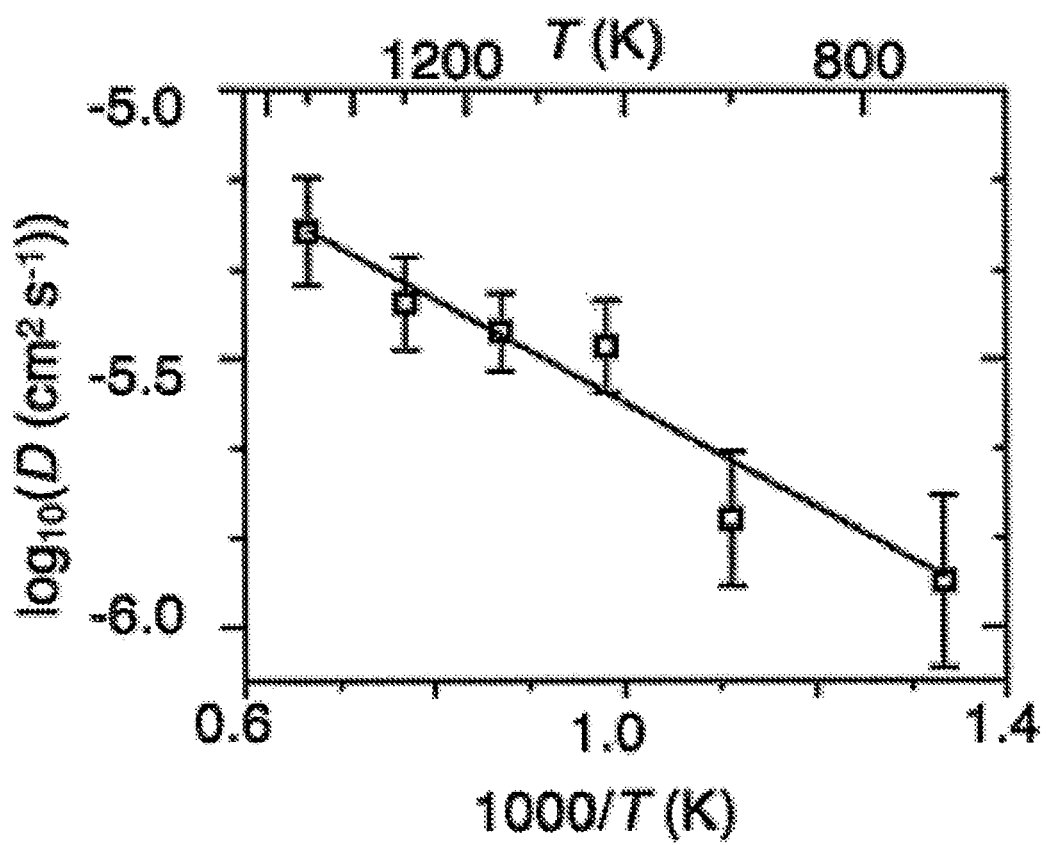
FIG. 21B shows the calculated Arrhenius relationship of diffusivity in $Li_{2.94}AlN_2$.

The $Li^+$ diffusivity calculated at temperatures ranging from 900 K to 1500 K follows an Arrhenius-type relation (FIG. 21B) with an activation energy of 0.20 eV and an extrapolated $Li^+$ conductivity of 4 mS cm$^{-1}$ at 300 K (Table 1).

The migration of a single $Li^+$ ion mediated by a $Li^+$ vacancy is observed as the dominant diffusion mechanism in this structure.

Figure 21C:
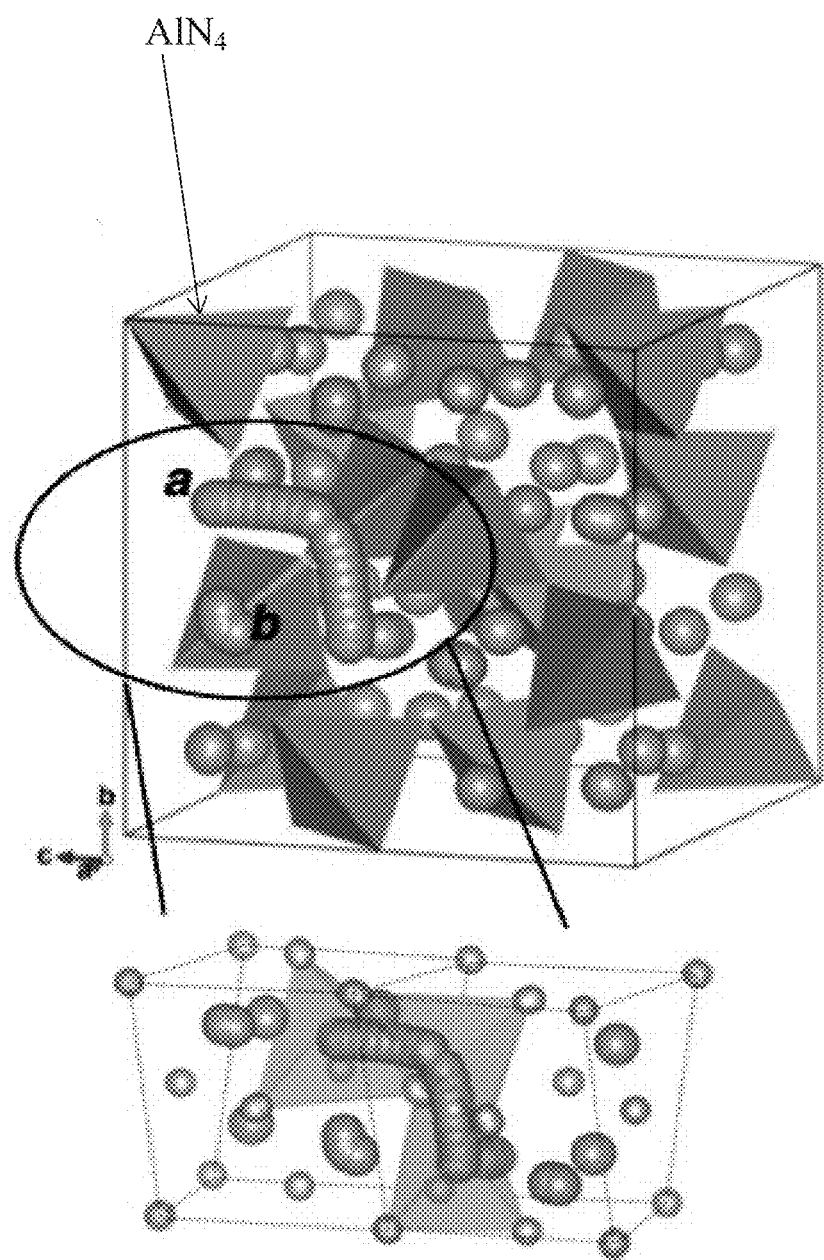
FIG. 21C shows $Li^+$ migration along different pathways, a and b. The structure in the subset shows the pathways within the FCC Nitrogen ion framework.
Figure 21D:
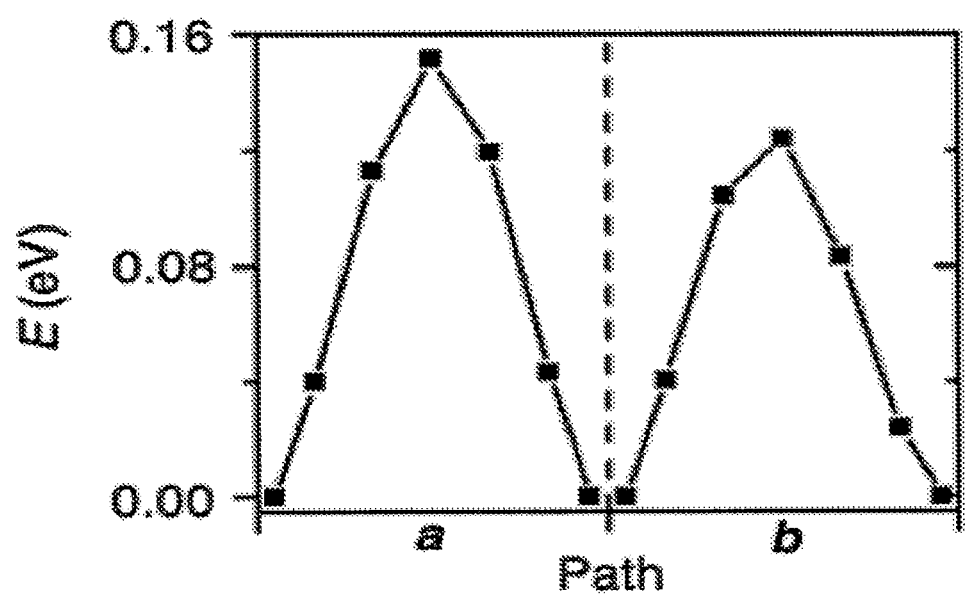
FIG. 21D shows migration barriers for $Li^+$ migration along pathways a and b.

An investigation of this mechanism along different migration pathways, using nudged elastic band (NEB) methods, revealed low energy barriers for migration between neighboring $Li^+$ vacancy tetrahedral sites (FIGS. 21C and 21D). The structure in the subset shows the pathways within the FCC Nitrogen ion framework.

The $Li^+$ migration along the pathways a and b has a migration energy barrier of 0.12 and 0.15 eV, respectively.

During migration, the $Li^+$ vacancy passes along the shared edge of the neighboring $LiN_4$ tetrahedra (FIG. 21C).

B. Lithium ion diffusion in $Li_3ScN_2$ $Li_3ScN_2$, which is isotypic to $Li_3AlN_2$, was also observed to exhibit fast lithium ion diffusion with one $Li^+$ vacancy inserted.

Figure 22A:
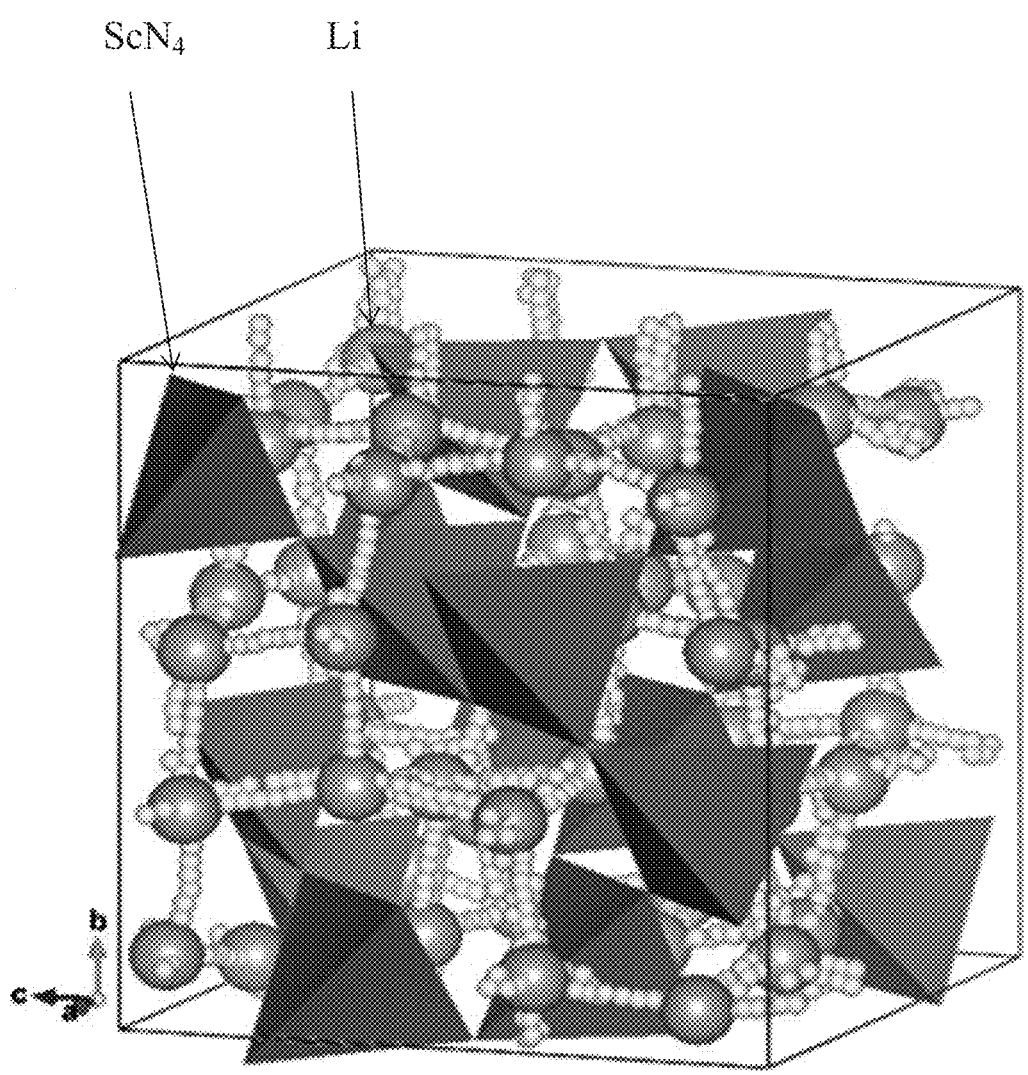
FIG. 22A shows time-averaged trajectories of $Li^+$ in $Li_{2.94}ScN_2$ from AIMD at 900 K.

The lithium ion diffusion is three-dimensional (3D) and percolates throughout the entire unit cell (FIG. 22A). The positions of the mobile $Li^+$ are averaged over a period of 0.8 ps and the initial positions of non-diffusing atoms are shown as polyhedral.

Figure 22B:
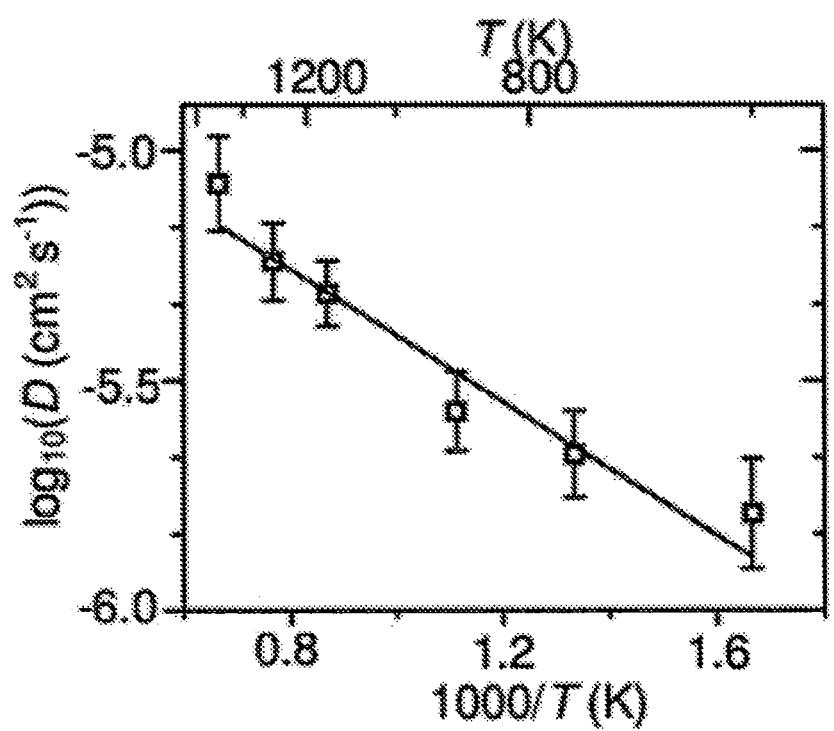
FIG. 22B shows the Arrhenius relationship of $Li^+$ diffusivity in $Li_{2.94}ScN_2$.

The $Li^+$ diffusivity calculated at temperatures ranging from 600 K to 1500 K follows an Arrhenius-type relation (FIG. 22B) with an activation energy of 0.14 eV and an extrapolated $Li^+$ conductivity of 23 mS cm$^{-1}$ at 300 K (Table 1).

The $Li^+$ diffusion mechanism is again observed to be mediated by a $Li^+$ vacancy.

Figure 22C:
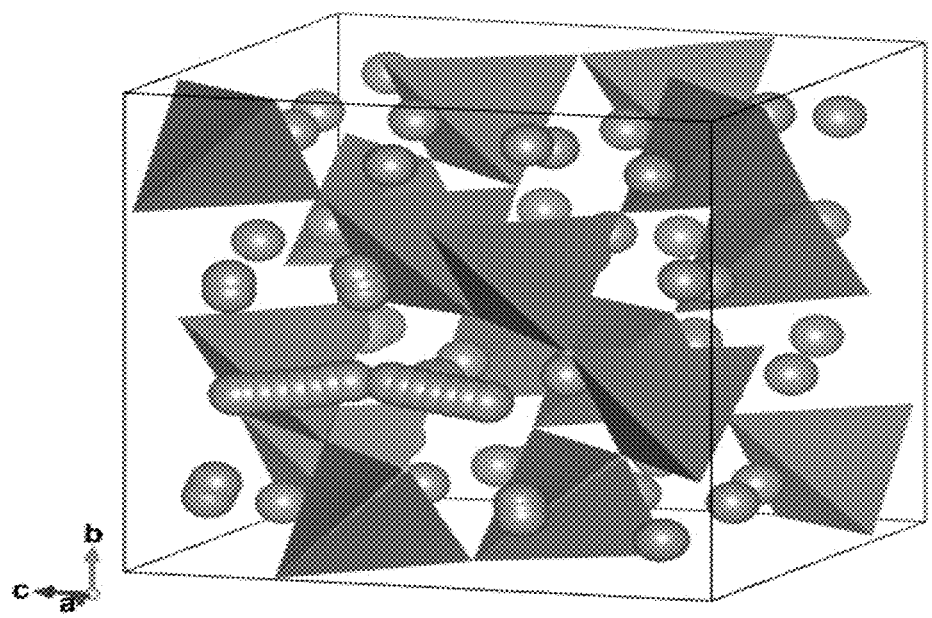
FIG. 22C shows $Li^+$ migration along different pathways, a and b in $Li_{2.94}ScN_2$.
Figure 22D:
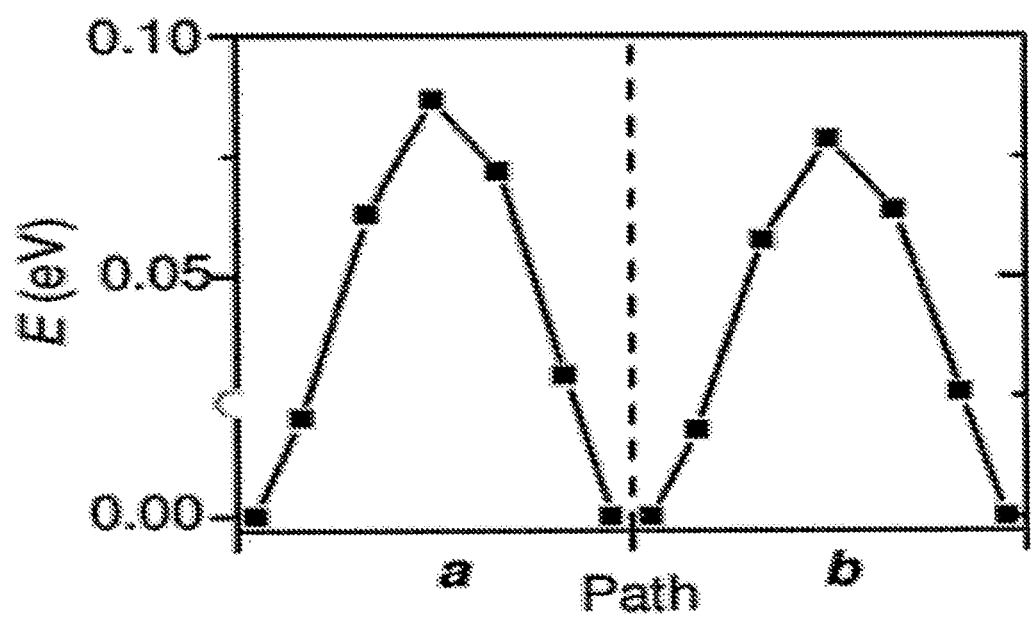
FIG. 22D shows migration barriers for $Li^+$ migration along pathways a and b in $Li_{2.94}ScN_2$.

The NEB investigation of $Li^+$ vacancy migration confirms facile diffusion between neighboring tetrahedral sites (FIGS. 22C and 22D).

The $Li^+$ migration along the pathways a and b have migration energy barriers of 0.09 and 0.08 eV, respectively.

During migration, the $Li^+$ vacancy is also observed to pass along the shared tetrahedral edge.

Figure 23A:
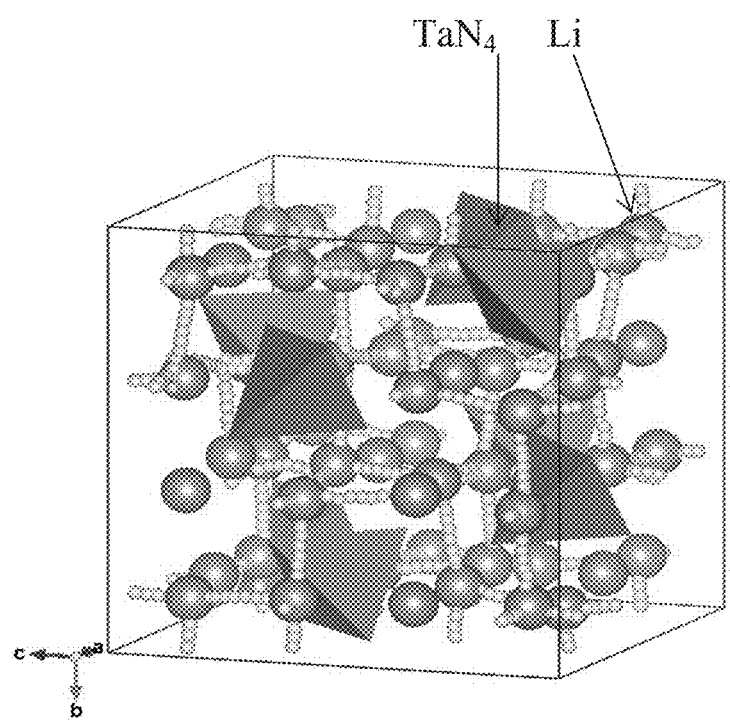
FIG. 23A shows time-averaged trajectories of $Li^+$ in $Li_{6.88}Ta_7N_{32}$ from AIMD at 900K.
Figure 23B:
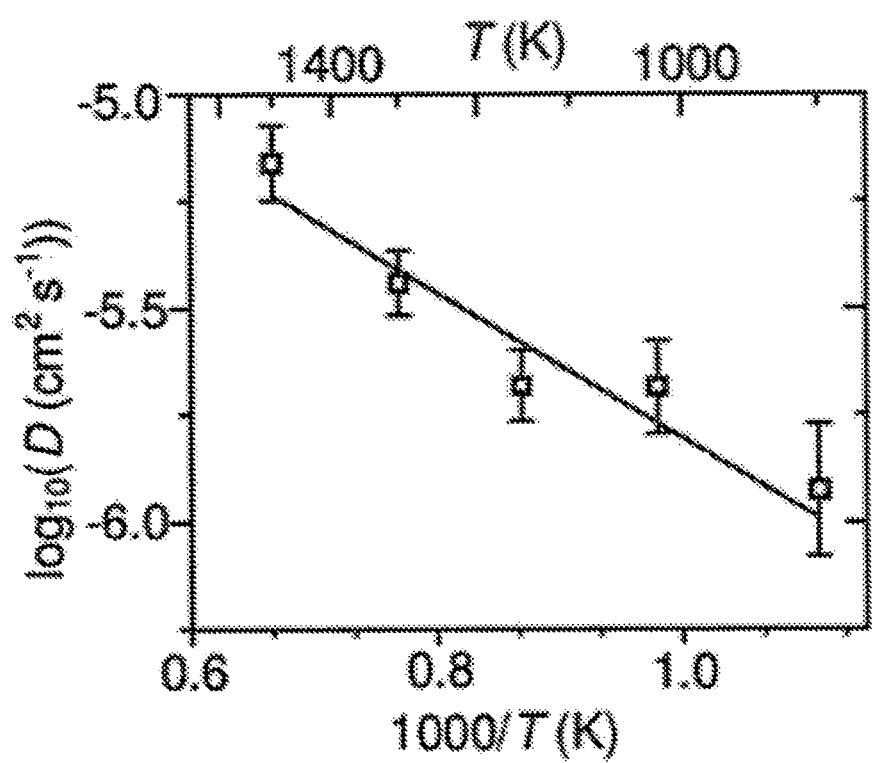
FIG. 23B shows Arrhenius relationship of diffusivity of $Li^+$ in $Li_{6.88}Ta_7N_{32}$.
Figure 23C:
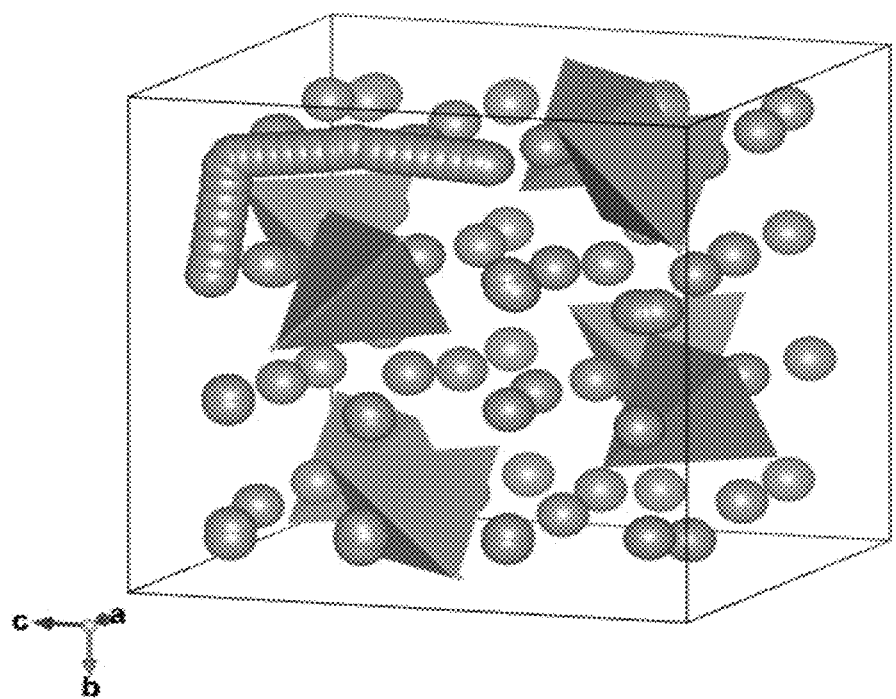
FIG. 23C shows $Li^+$ migration along different pathways a, b, and c in $Li_{6.88}Ta_7N_{32}$.
Figure 23D:
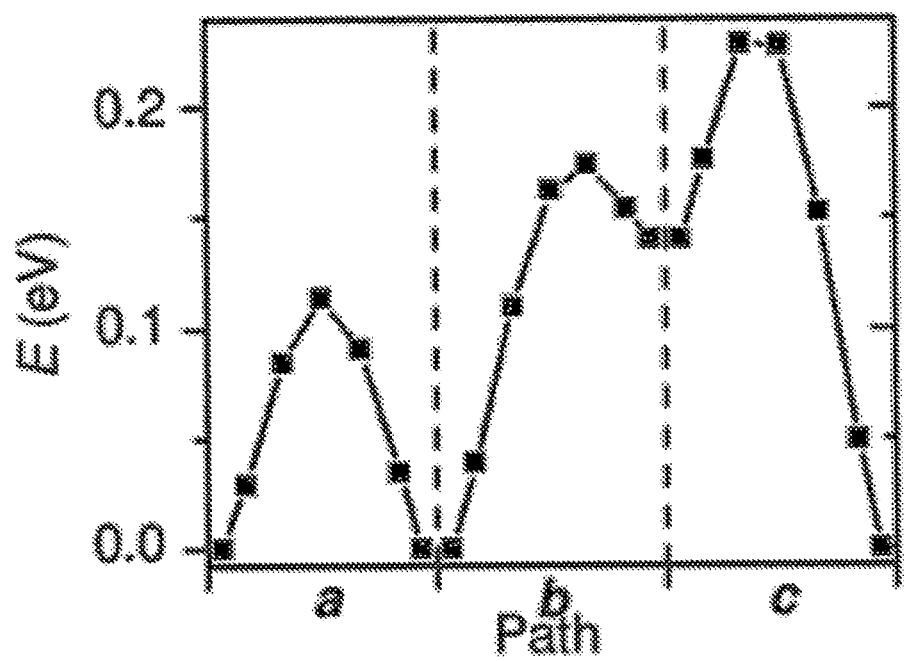
FIG. 23D shows migration barriers for $Li^+$ migration along pathways a, b, and c for $Li^+$ in $Li_{6.88}Ta_7N_{32}$

C. Lithium ion diffusion in $Li_7TaN_4$ $Li_7TaN_4$ crystallizes in the Pa$\bar{3}$ spacegroup. With 56 $Li^+$ sites (Wyckoff numbers 8c, 24d, and 24d), the structure is a Li rich variant of the anti-fluorites $Li_3ScN_2$ and $Li_3AlN_2$. Fast lithium ion diffusion was observed in AIMD simulations of the structure with one $Li^+$ vacancy inserted. The $Li^+$ diffusion was observed to be 3D and to percolate through the entire unit cell (FIG. 23A). The positions of mobile $Li^+$ are averaged over a period of 0.8 ps and the initial positions of non-diffusing atoms are shown as polyhedra. The $Li^+$ diffusivity calculated at temperatures ranging from 900 to 1500 K (FIG. 23B) is two orders of magnitude slower than $Li_3ScN_2$ and $Li_3AlN_2$, with an activation energy of 0.34 eV and an extrapolated $Li^+$ conductivity of 0.06 mS cm$^{-1}$ at 300 K (Table 1). The facile diffusion was confirmed by the low migration barriers calculated using NEB methods (FIGS. 23 C and D). The migration energy barriers along the representative pathways a, b, and c are 0.11, 0.15, and 0.24, respectively. The c path is likely the rate-limiting step. Thus, the migration energy barrier being about 0.1 eV greater than $Li_3ScN_2$ and $Li_3AlN_2$ aligns well with the slower diffusivity observed in AIMD simulation.

TABLE 1

Calculated Li-ion Diffusional Properties of Investigated Structures

| | $E_a$ (eV) | $\sigma_{RT}$ (mS cm$^{-1}$) | $\sigma_{RT}$ bounds (mS cm$^{-1}$) |
|---|---|---|---|
| $Li_{2.94}AlN_2$ | 0.20 ± 0.04 | 4.4 | [0.7, 27.4] |
| $Li_{2.94}ScN_2$ | 0.14 ± 0.02 | 22.7 | [8.5, 60.5] |
| $Li_{6.88}TaN_4$ | 0.34 ± 0.06 | 0.06 | [5×10$^{-3}$, 0.77] |

The invention claimed is:

1. A solid-state lithium ion electrolyte of formula (I), (II) or (III) or mixture thereof:

$$Li_y(M1)_{x1}BN_2 \quad (I)$$

wherein x1 is a number from greater than 0 to less than 3, y is a value such that charge neutrality is obtained, and M1 is at least one element aliovalently substituted for Li in a crystal lattice of the solid state lithium ion electrolyte selected from elements of groups 3, 4, 12 and 13;

$$Li_yB_{1-x2}(M2)_{x2}N_2 \quad (II)$$

wherein x2 is a number from greater than 0 to less than 1, y is a value such that charge neutrality is obtained, and M2 is at least one element different from B aliovalently substituted for B in a crystal lattice of the solid state lithium ion electrolyte selected from elements of groups 3, 4, 12 and 13; and

$$Li_yBN_{2-x3}(X)_{x3} \quad (III)$$

wherein x3 is a number from greater than 0 to less than 2, y is a value such that charge neutrality is obtained, and X is at least one element different from N aliovalently substituted for N in a crystal lattice of the solid state lithium ion electrolyte selected from elements of groups 15, 16 and 17;

wherein the solid state electrolyte has a crystal lattice structure having an anti-fluorite $A_2X$ unit cell.

2. The solid-state lithium ion electrolyte according to claim 1, wherein
a lithium ion ($Li^+$) conductivity of the material is from $10^{-6}$ to 10 mS/cm at 300K, and
an activation energy is from 0.20 to 1.20 eV.

3. The solid state lithium ion electrolyte according to claim 1, wherein the electrolyte has an X-ray Diffraction analysis (XRD) comprising the following peaks:

| Peak Position | Relative Intensity |
| --- | --- |
| 22.56 | 18.15 |
| 27.37 | 41.97 |
| 28.55 | 47.80 |
| 28.98 | 13.63 |
| 30.19 | 58.12 |
| 30.48 | 26.65 |
| 31.27 | 65.80 |
| 31.44 | 50.79 |
| 31.53 | 100.00 |
| 37.75 | 13.53 |
| 39.79 | 13.26 |
| 45.36 | 19.94 |
| 45.79 | 22.19 |
| 47.24 | 21.71 |
| 47.76 | 15.88 |
| 48.07 | 22.56 |
| 53.81 | 10.89 |
| 54.14 | 23.92. |

4. A solid state lithium battery, comprising:
an anode comprising a current collector and an anode active material on the current collector;
a cathode comprising a current collector and a cathode active material on the current collector; and
a solid state lithium ion electrolyte located between the anode and the cathode;
wherein
the solid state lithium ion electrolyte is at least one material selected from the group of compounds of formulae (I), (II) and (III):

$$Li_y(M1)_{x1}BN_2 \quad (I)$$

wherein x1 is a number from greater than 0 to less than 3, y is a value such that charge neutrality is obtained, and M1 is at least one element aliovalently substituted for Li in a crystal lattice of the solid state lithium ion electrolyte selected from elements of groups 3, 4, 12 and 13;

$$Li_yB_{1-x2}(M2)_{x2}N_2 \quad (II)$$

wherein x2 is a number from greater than 0 to less than 1, y is a value such that charge neutrality is obtained, and M2 is at least one element different from B aliovalently substituted for B in a crystal lattice of the solid state lithium ion electrolyte selected from elements of groups 3, 4, 12 and 13; and $$Li_yBN_{2-x3}(X)_{x3} \quad (III)$$

wherein x3 is a number from greater than 0 to less than 2, y is a value such that charge neutrality is obtained, and X is at least one element different from N aliovalently substituted for N in a crystal lattice of the solid state lithium ion electrolyte selected from elements of groups 15, 16 and 17;
wherein the solid state electrolyte comprises a crystal lattice structure having an anti-fluorite $A_2X$ unit cell.

* * * * *